(12) United States Patent
Koizumi et al.

(10) Patent No.: US 8,274,741 B2
(45) Date of Patent: Sep. 25, 2012

(54) LENS ARRAY, AN EXPOSURE HEAD AND AN IMAGE FORMING APPARATUS

(75) Inventors: Ryuta Koizumi, Shiojiri (JP); Yujiro Nomura, Shiojiri (JP); Takeshi Sowa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 190 days.

(21) Appl. No.: 12/914,408

(22) Filed: Oct. 28, 2010

(65) Prior Publication Data

US 2011/0043593 A1  Feb. 24, 2011

Related U.S. Application Data

(63) Continuation of application No. 12/357,231, filed on Jan. 21, 2009, now Pat. No. 7,848,023.

(30) Foreign Application Priority Data

Jan. 25, 2008 (JP) ................... 2008-014497
Nov. 28, 2008 (JP) ................... 2008-304814

(51) Int. Cl.
G02B 27/10 (2006.01)
G03G 15/04 (2006.01)
B41J 15/14 (2006.01)

(52) U.S. Cl. ................... 359/619; 399/218; 347/241

(58) Field of Classification Search ................... 359/619; 399/218; 347/241, 256
See application file for complete search history.

(56) References Cited

U.S. PATENT DOCUMENTS

| 5,363,240 | A | 11/1994 | Miyashita |
| 6,980,366 | B2 | 12/2005 | Ishikawa |
| 7,835,082 | B2 * | 11/2010 | Tsujino et al. ................ 359/622 |
| 2006/0268097 | A1 | 11/2006 | Yosuke |
| 2008/0030566 | A1 | 2/2008 | Nomura et al. |

FOREIGN PATENT DOCUMENTS

| CN | 101030027 A | 9/2007 |
| JP | 06-278314 | 10/1994 |
| JP | 2005-276849 | 10/2005 |

* cited by examiner

*Primary Examiner* — William Choi
(74) *Attorney, Agent, or Firm* — DLA Piper LLP (US)

(57) ABSTRACT

An exposure head, includes: a lens array that includes lenses that are arranged in a first direction and in a second direction orthogonal to the first direction; and a light emitting element substrate that is provided with light emitting elements that emit lights to be imaged by the lenses, wherein a relationship defined by a following formula: $1<L1/L2$ is satisfied, where the symbol L1 denotes a length of the lens in the first direction and the symbol L2 denotes a length of the lens in the second direction.

4 Claims, 27 Drawing Sheets

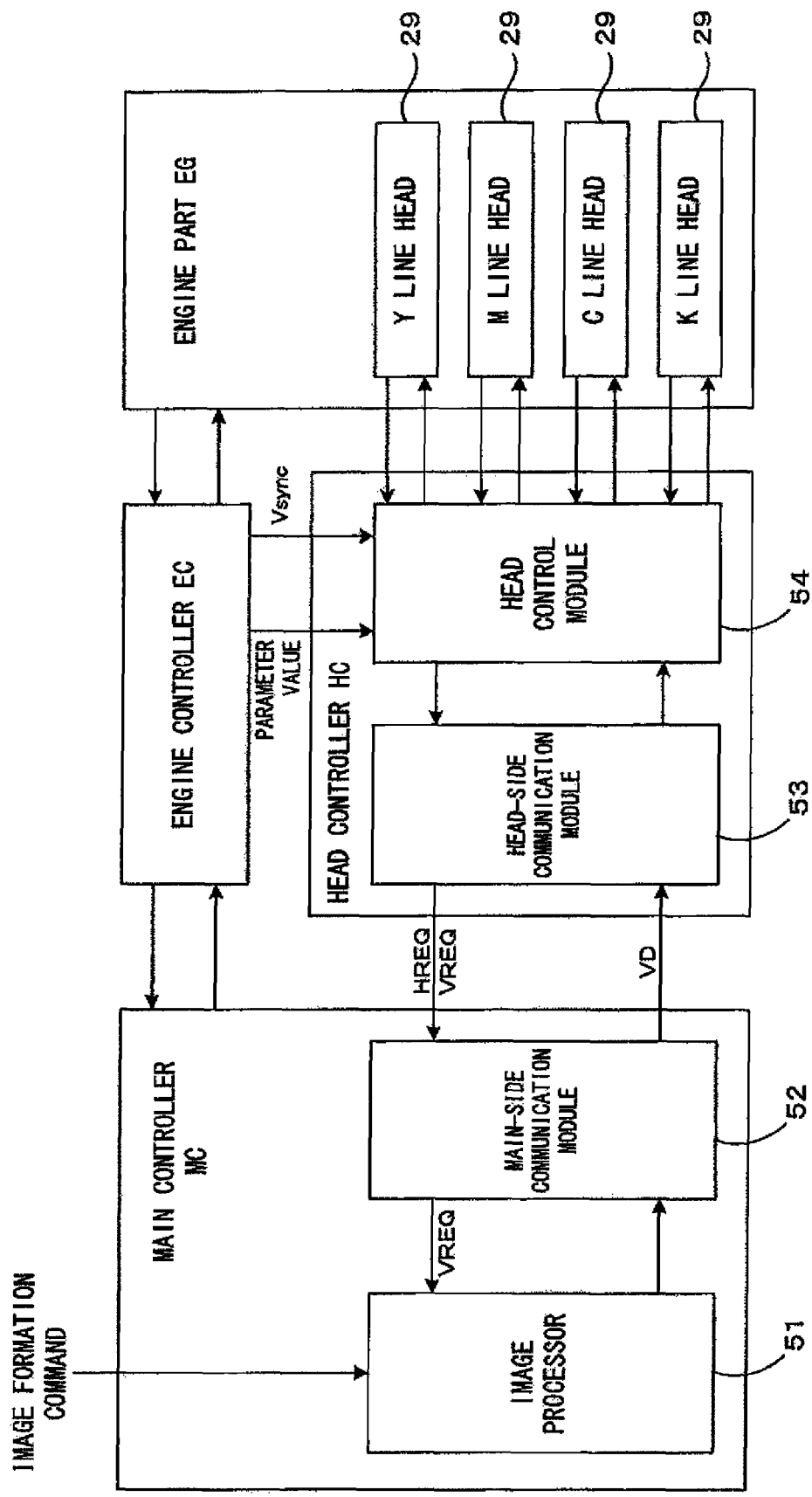
F I G. 4

F I G. 6
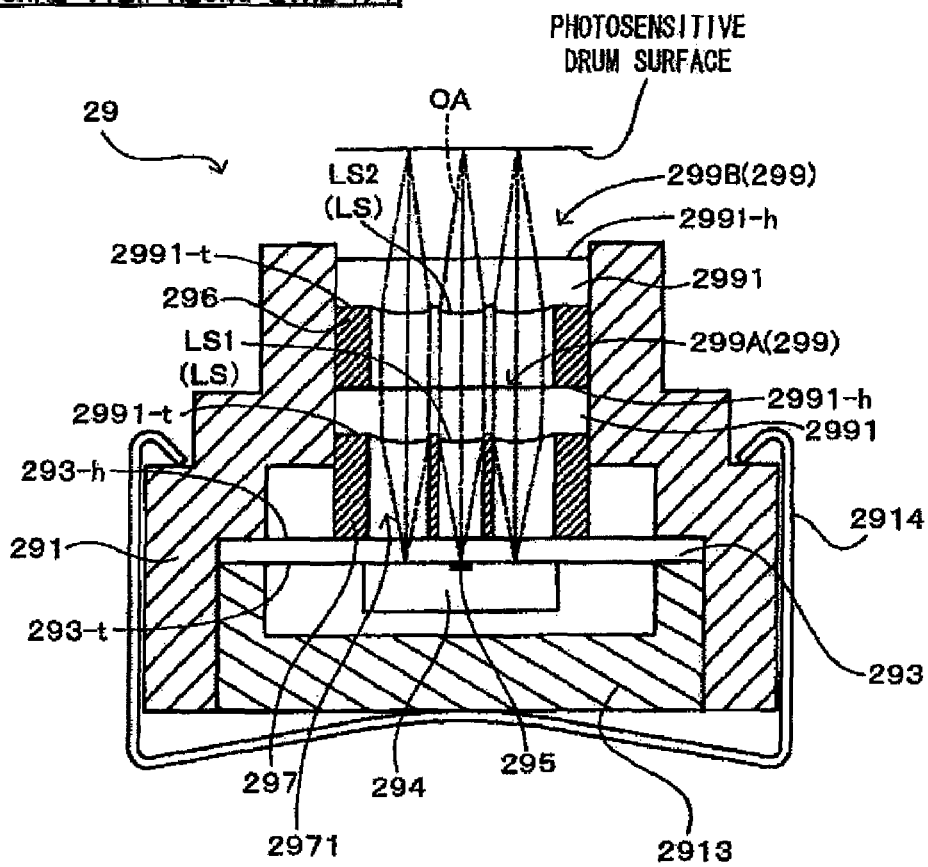

F I G. 2 0

OPTICAL DATA

| ITEM | VALUE |
|---|---|
| WAVELENGTH | 690 nm |
| DIAMETER OF PHOTOSENSITIVE MEMBER | φ 40 mm |

FIG. 21

DATA OF OPTICAL SYSTEMS INCLUDING LENSES LS-m

| SURFACE NUMBER | SURFACE TYPE | CURVATURE RADIUS | SURFACE INTERVAL | REFRACTIVE INDEX | ABBE CONSTANT |
|---|---|---|---|---|---|
| S1 (OBJECT PLANE) | | ∞ | 0.55 | $n_d=1.5168$ | $v_d=64.2$ |
| S2 | | ∞ | 4.206 | | |
| S3 (APERTURE) | | ∞ | 0.03 | | |
| S4 | x-y POLYNOMIAL SURFACE | SEE FIG. 21 | 0.26 | $n_d=1.53$ | $v_d=50.8$ |
| S5 | | ∞ | 0.9 | $n_d=1.541$ | $v_d=57$ |
| S6 | | ∞ | 1.393 | | |
| S7 | x-y POLYNOMIAL SURFACE | SEE FIG. 22 | 0.29 | $n_d=1.53$ | $v_d=50.8$ |
| S8 | | ∞ | 0.9 | $n_d=1.541$ | $v_d=57$ |
| S9 | | ∞ | 0.879 | | |
| S10 (IMAGE PLANE) | | ∞ | | | |

FIG. 22

● DEFINITION OF x-y POLYNOMIAL SURFACE
EQUALITIES BELOW ARE USED $$z(x,y) = \frac{cr^2}{1 + \sqrt{1 - (1+k)c^2r^2}} + \sum_{j=2}^{66} C_j x^n y^m$$

$$j = [(m+n)^2 + m + 3n]/2 + 1$$

WHERE
z: SAG OF SURFACE PARALLEL TO z-AXIS
c: CURVATURE AT TOP OF SURFACE
k: CONIC COEFFICIENT
Cj: COEFFICIENT OF MONOMIAL $x^m y^n$
x: x-AXIS (MAIN SCANNING DIRECTION) COORDINATE
y: y-AXIS (SUB SCANNING DIRECTION) COORDINATE

FIG. 23

VALUES OF COEFFICIENTS EXPRESSING SURFACES S4 OF OPTICAL SYSTEMS INCLUDING LENSES LS-m

| NAME OF COEFFICIENT | | VALUE | NAME OF COEFFICIENT | | VALUE |
|---|---|---|---|---|---|
| CURVATURE c | | 0.61583 | | | |
| CONIC CONSTANT k | | −1.03580 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.029156 | C37 | $x^8$ | 0 |
| C5 | $xy$ | 0 | C38 | $x^7y$ | 0 |
| C6 | $y^2$ | 0.029554 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 5.3207E−04 | C44 | $xy^7$ | 0 |
| C12 | $x^3y$ | 0 | C45 | $y^8$ | 0 |
| C13 | $x^2y^2$ | 4.6625E−03 | C46 | $x^9$ | 0 |
| C14 | $xy^3$ | 0 | C47 | $x^8y$ | 0 |
| C15 | $y^4$ | 3.2119E−03 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | 1.4859E−04 | C55 | $y^9$ | 0 |
| C23 | $x^5y$ | 0 | C56 | $x^{10}$ | 0 |
| C24 | $x^4y^2$ | −1.5016E−03 | C57 | $x^9y$ | 0 |
| C25 | $x^3y^3$ | 0 | C58 | $x^8y^2$ | 0 |
| C26 | $x^2y^4$ | 1.7973E−03 | C59 | $x^7y^3$ | 0 |
| C27 | $xy^5$ | 0 | C60 | $x^6y^4$ | 0 |
| C28 | $y^6$ | −2.7614E−03 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 24

VALUES OF COEFFICIENTS EXPRESSING SURFACES S7 OF
OPTICAL SYSTEMS INCLUDING LENSES LS-III

| NAME OF COEFFICIENT | | VALUE | NAME OF COEFFICIENT | | VALUE |
|---|---|---|---|---|---|
| CURVATURE c | | 0.52055 | | | |
| CONIC CONSTANT k | | -7.15895 | C34 | $x^2y^6$ | 0 |
| C2 | $x$ | 0 | C35 | $xy^6$ | 0 |
| C3 | $y$ | 0 | C36 | $y^7$ | 0 |
| C4 | $x^2$ | 0.132693 | C37 | $x^8$ | 0 |
| C5 | $xy$ | 0 | C38 | $x^7y$ | 0 |
| C6 | $y^2$ | 0.127483 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 8.7695E-02 | C44 | $xy^7$ | 0 |
| C12 | $x^3y$ | 0 | C45 | $y^8$ | 0 |
| C13 | $x^2y^2$ | 0.1537591 | C46 | $x^9$ | 0 |
| C14 | $xy^3$ | 0 | C47 | $x^8y$ | 0 |
| C15 | $y^4$ | 0.0699629 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | -0.07651391 | C55 | $y^9$ | 0 |
| C23 | $x^5y$ | 0 | C56 | $x^{10}$ | 0 |
| C24 | $x^4y^2$ | -0.2261404 | C57 | $x^9y$ | 0 |
| C25 | $x^3y^3$ | 0 | C58 | $x^8y^2$ | 0 |
| C26 | $x^2y^4$ | -0.2369140 | C59 | $x^7y^3$ | 0 |
| C27 | $xy^5$ | 0 | C60 | $x^6y^4$ | 0 |
| C28 | $y^6$ | -0.0296410 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 25

DATA OF OPTICAL SYSTEMS INCLUDING LENSES LS-u, LS-d

| SURFACE NUMBER | SURFACE TYPE | CURVATURE RADIUS | SURFACE INTERVAL | REFRACTIVE INDEX | ABBE CONSTANT |
|---|---|---|---|---|---|
| S1 (OBJECT PLANE) | | ∞ | 0.55 | $n_d=1.5168$ | $v_d=64.2$ |
| S2 | | ∞ | 4.206 | | |
| S3 (APERTURE) | | ∞ | 0.04 | | |
| S4 | x-y POLYNOMIAL SURFACE | SEE FIG. 24 | 0.25 | $n_d=1.53$ | $v_d=50.8$ |
| S5 | | ∞ | 0.9 | $n_d=1.541$ | $v_d=57$ |
| S6 | | ∞ | 1.403 | | |
| S7 | x-y POLYNOMIAL SURFACE | SEE FIG. 25 | 0.28 | $n_d=1.53$ | $v_d=50.8$ |
| S8 | | ∞ | 0.9 | $n_d=1.541$ | $v_d=57$ |
| S9 | | ∞ | 0.957 | | |
| S10 (IMAGE PLANE) | | ∞ | | | |

FIG. 26

VALUES OF COEFFICIENTS EXPRESSING SURFACES S4 OF OPTICAL SYSTEMS INCLUDING LENSES LS-u, LS-d

| NAME OF COEFFICIENT | | VALUE | NAME OF COEFFICIENT | | VALUE |
|---|---|---|---|---|---|
| CURVATURE c | | 0.59789 | | | |
| CONIC CONSTANT k | | -0.99318 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.024253 | C37 | $x^8$ | 0 |
| C5 | $xy$ | 0 | C38 | $x^7y$ | 0 |
| C6 | $y^2$ | 0.025321 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | -1.1642E-03 | C44 | $xy^7$ | 0 |
| C12 | $x^3y$ | 0 | C45 | $y^8$ | 0 |
| C13 | $x^2y^2$ | 3.5772E-04 | C46 | $x^9$ | 0 |
| C14 | $xy^3$ | 0 | C47 | $x^8y$ | 0 |
| C15 | $y^4$ | -3.6377E-04 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | 1.4859E-04 | C55 | $y^9$ | 0 |
| C23 | $x^5y$ | 0 | C56 | $x^{10}$ | 0 |
| C24 | $x^4y^2$ | -1.5016E-03 | C57 | $x^9y$ | 0 |
| C25 | $x^3y^3$ | 0 | C58 | $x^8y^2$ | 0 |
| C26 | $x^2y^4$ | 1.7973E-03 | C59 | $x^7y^3$ | 0 |
| C27 | $xy^5$ | 0 | C60 | $x^6y^4$ | 0 |
| C28 | $y^6$ | -2.7614E-03 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 27

VALUES OF COEFFICIENTS EXPRESSING SURFACES S7 OF OPTICAL SYSTEMS INCLUDING LENSES LS-u, LS-d

| NAME OF COEFFICIENT | | VALUE | NAME OF COEFFICIENT | | VALUE |
|---|---|---|---|---|---|
| CURVATURE c | | 0.63428 | | | |
| CONIC CONSTANT k | | -5.48113 | C34 | $x^2y^5$ | 0 |
| C2 | $x$ | 0 | C35 | $xy^6$ | 0 |
| C3 | $y$ | 0 | C36 | $y^7$ | 0 |
| C4 | $x^2$ | 0.076729 | C37 | $x^8$ | 0 |
| C5 | $xy$ | 0 | C38 | $x^7y$ | 0 |
| C6 | $y^2$ | 0.070842 | C39 | $x^6y^2$ | 0 |
| C7 | $x^3$ | 0 | C40 | $x^5y^3$ | 0 |
| C8 | $x^2y$ | 0 | C41 | $x^4y^4$ | 0 |
| C9 | $xy^2$ | 0 | C42 | $x^3y^5$ | 0 |
| C10 | $y^3$ | 0 | C43 | $x^2y^6$ | 0 |
| C11 | $x^4$ | 1.1859E-01 | C44 | $xy^7$ | 0 |
| C12 | $x^3y$ | 0 | C45 | $y^8$ | 0 |
| C13 | $x^2y^2$ | 0.2325575 | C46 | $x^9$ | 0 |
| C14 | $xy^3$ | 0 | C47 | $x^8y$ | 0 |
| C15 | $y^4$ | 0.1200360 | C48 | $x^7y^2$ | 0 |
| C16 | $x^5$ | 0 | C49 | $x^6y^3$ | 0 |
| C17 | $x^4y$ | 0 | C50 | $x^5y^4$ | 0 |
| C18 | $x^3y^2$ | 0 | C51 | $x^4y^5$ | 0 |
| C19 | $x^2y^3$ | 0 | C52 | $x^3y^6$ | 0 |
| C20 | $xy^4$ | 0 | C53 | $x^2y^7$ | 0 |
| C21 | $y^5$ | 0 | C54 | $xy^8$ | 0 |
| C22 | $x^6$ | -0.07587761 | C55 | $y^9$ | 0 |
| C23 | $x^5y$ | 0 | C56 | $x^{10}$ | 0 |
| C24 | $x^4y^2$ | -0.2438945 | C57 | $x^9y$ | 0 |
| C25 | $x^3y^3$ | 0 | C58 | $x^8y^2$ | 0 |
| C26 | $x^2y^4$ | -0.2671152 | C59 | $x^7y^3$ | 0 |
| C27 | $xy^5$ | 0 | C60 | $x^6y^4$ | 0 |
| C28 | $y^6$ | -0.0673911 | C61 | $x^5y^5$ | 0 |
| C29 | $x^7$ | 0 | C62 | $x^4y^6$ | 0 |
| C30 | $x^6y$ | 0 | C63 | $x^3y^7$ | 0 |
| C31 | $x^5y^2$ | 0 | C64 | $x^2y^8$ | 0 |
| C32 | $x^4y^3$ | 0 | C65 | $xy^9$ | 0 |
| C33 | $x^3y^4$ | 0 | C66 | $y^{10}$ | 0 |

FIG. 28

NUMERICAL EXAMPLE OF LENS ARRAY

| ITEM | VALUE |
| --- | --- |
| LENS PITCH Pls | 1.778 mm |
| LENS ROW PITCH Plsr | 1.54 mm |
| LENS LONGITUDINAL DIRECTION LENGTH L1 | 1.7 mm |
| LENS WIDTH DIRECTION LENGTH L2 | 1.5 mm |
| DISTANCE ΔFP | 0.078 mm |
| DIAMETER OF CORRESPONDING PHOTOSENSITIVE MEMBER | 30 mm |

FIG. 29

NUMERICAL EXAMPLE OF LENS ARRAY

| ITEM | VALUE |
| --- | --- |
| LENS ROW PITCH (Plsr) | 1.5 mm |
| DISTANCE ΔFP | 0.05 mm |
| DIAMETER OF CORRESPONDING PHOTOSENSITIVE MEMBER | 45 mm | ary
LENS ARRAY, AN EXPOSURE HEAD AND AN IMAGE FORMING APPARATUS

CROSS REFERENCE TO RELATED APPLICATION

This application is a continuation of application Ser. No. 12/357,231, filed Jan. 21, 2009, now U.S. Pat. No. 7,848,023 and claims the benefit of priority under 35 USC 119 of Japanese Patent Applications No. 2008-14497 filed on Jan. 25, 2008 and No. 2008-304814 filed on Nov. 28, 2008, which are incorporated herein by reference.

BACKGROUND

1. Technical Field

This invention relates to a lens array for imaging lights from light emitting elements using lenses, an exposure head using the lens array and an image forming apparatus using the exposure head.

2. Related Art

A line head in which a plurality of substantially circular lenses are aligned in a longitudinal direction, for example, disclosed in FIG. 2 and the like of JP-A-6-278314 is known as such an exposure head. In this line head, the plurality of lenses are aligned in the longitudinal direction and the respective lenses image lights incident from the light emitting elements. A latent image carrier such as photosensitive drum is exposed by the lights imaged by the respective lenses to form a latent image.

SUMMARY

In order to deal with an exposure at a higher resolution, a lens array can be formed by two-dimensionally arranging a plurality of lenses. In other words, in this lens array, a plurality of lens rows each made up of a plurality of lenses aligned in the longitudinal direction (first direction) are arranged in a width direction (second direction) orthogonal to or substantially orthogonal to the longitudinal direction.

In light of a good exposure, it is preferable that large quantities of lights are incident on the lenses. Accordingly, it is, for example, thought to enlarge the lenses. However, since the lenses in the above related art are substantially circular, pitches between the lenses in the width direction (second direction) increase if the lenses are enlarged. Thus, there has been a possibility of enlarging the line head. Such enlargement of the line head causes a problem of cost increase.

An advantage of some aspects of the invention is to provide technology enabling the miniaturization of a line head (exposure head) while enabling a good exposure at a high resolution.

According to a first aspect of the invention, there is provided an exposure head, comprising: a lens array that includes lenses that are arranged in a first direction and in a second direction orthogonal to the first direction; and a light emitting element substrate that is provided with light emitting elements that emit lights to be imaged by the lenses, wherein a relationship defined by a following formula: $1 < L1/L2$ is satisfied, where the symbol L1 denotes a length of the lens in the first direction and the symbol L2 denotes a length of the lens in the second direction.

According to a second aspect of the invention, there is provided a lens array, comprising: lenses that are arranged in a first direction and in a second direction orthogonal to the first direction, wherein a relationship defined by a following formula: $1 < L1/L2$ is satisfied, where the symbol L1 denotes a length of the lens in the first direction and the symbol L2 denotes a length of the lens in the second direction.

According to a third aspect of the invention, there is provided an image forming apparatus, comprising: an exposure head that includes a lens array which has lenses that are arranged in a first direction and in a second direction orthogonal to the first direction, and a light emitting element substrate that is provided with light emitting elements that emit lights to be imaged by the lenses; and a latent image carrier that is exposed by the exposure head to form a latent image, wherein a relationship defined by a following formula: $1 < L1/L2$ is satisfied, where the symbol L1 denotes a length of the lens in the first direction and the symbol L2 denotes a length of the lens in the second direction.

In these aspects of the invention (exposure head, lens array, image forming apparatus) thus constructed, the length L1 of the first lens in the first direction and the length L2 thereof in the second direction are set to satisfy the following formula: $1 < L1/L2$. In other words, the length of the lens in the second direction is set to be shorter, whereas the length thereof in the first direction is set to be longer. Accordingly, larger quantities of lights can be incident on the lenses in the first direction while pitches between the lenses in the second direction are suppressed. Therefore, the exposure head can be miniaturized while a good exposure at a high resolution is enabled.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 4 is a diagram showing the electrical construction of the image forming apparatus of FIG. 3.

FIG. 6 is a partial sectional view along a width direction of the line head shown in FIG. 5 in which the cross section is parallel to the optical axis of the lens.

FIG. 20 is a table showing optical data according to this example.

FIG. 21 is a table showing the data of the optical systems which include the middle lenses.

FIG. 22 is a drawing of definitional equations which define the X-Y polynomial surfaces.

FIG. 23 is a table of the coefficients indicative of the surfaces S4 of the optical systems which include the middle lenses.

FIG. 24 is a table of the coefficients indicative of the surfaces S7 of the optical systems which include the middle lenses.

FIG. 25 is a table showing data of an optical system including upstream lenses and downstream lenses.

FIG. 26 is a table showing coefficient values of the surfaces S4 of the optical system including the upstream and downstream lenses.

FIG. 27 is a table showing coefficient values of the surfaces S7 of the optical system including the upstream and downstream lenses.

FIG. 28 is a table showing another numerical example and corresponds to a case where the diameter of the photosensitive drum is 30 [mm].

FIG. 29 is a table showing still another numerical example and corresponds to a case where the diameter of the photosensitive drum is 45 [mm].

DESCRIPTION OF EXEMPLARY EMBODIMENTS

Terms used in this specification are first described below (see "A. Description of Terms"). Following this description of terms, embodiments of the invention (see "B-1. First Embodiment" and the like) are described.

A. Description of Terms

Figure 1:
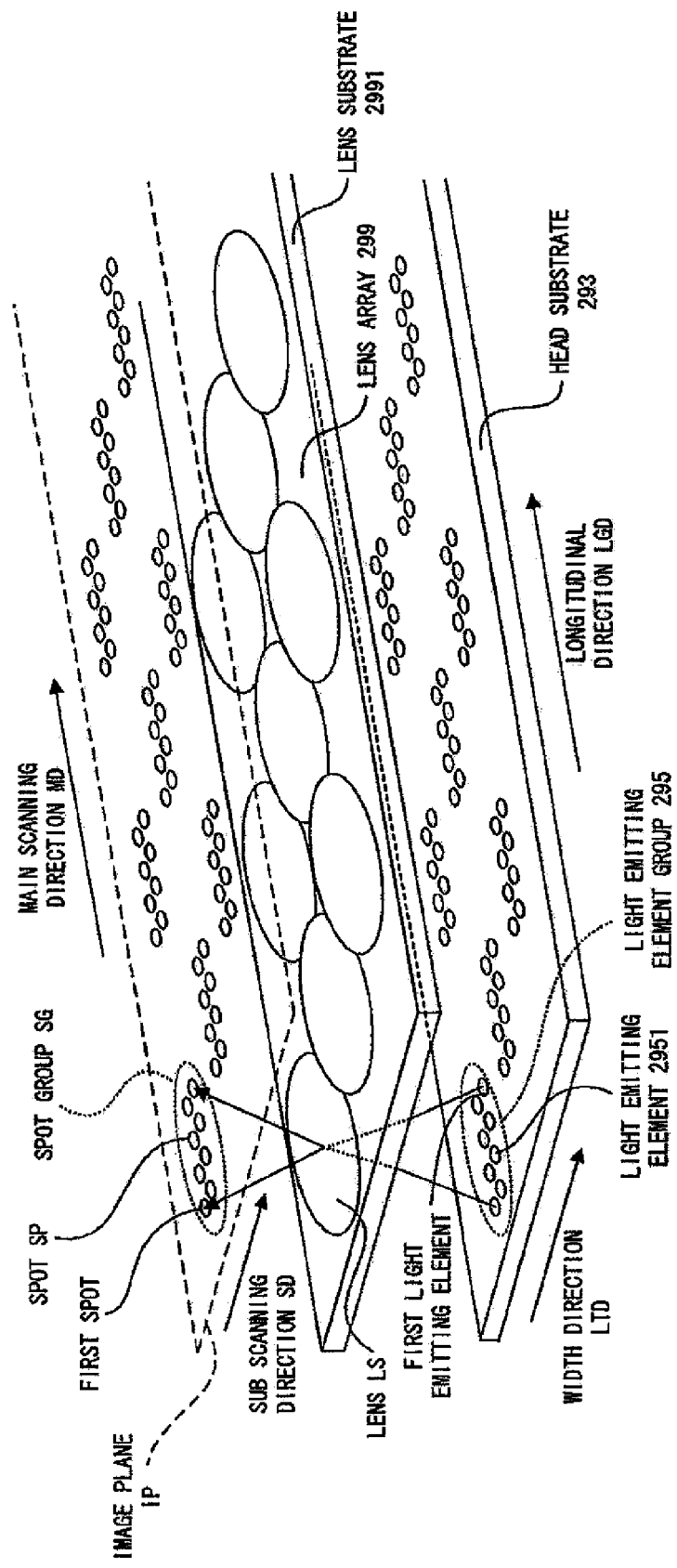
FIGS. 1 and 2 are diagrams showing terminology used in this specification.
Figure 2:
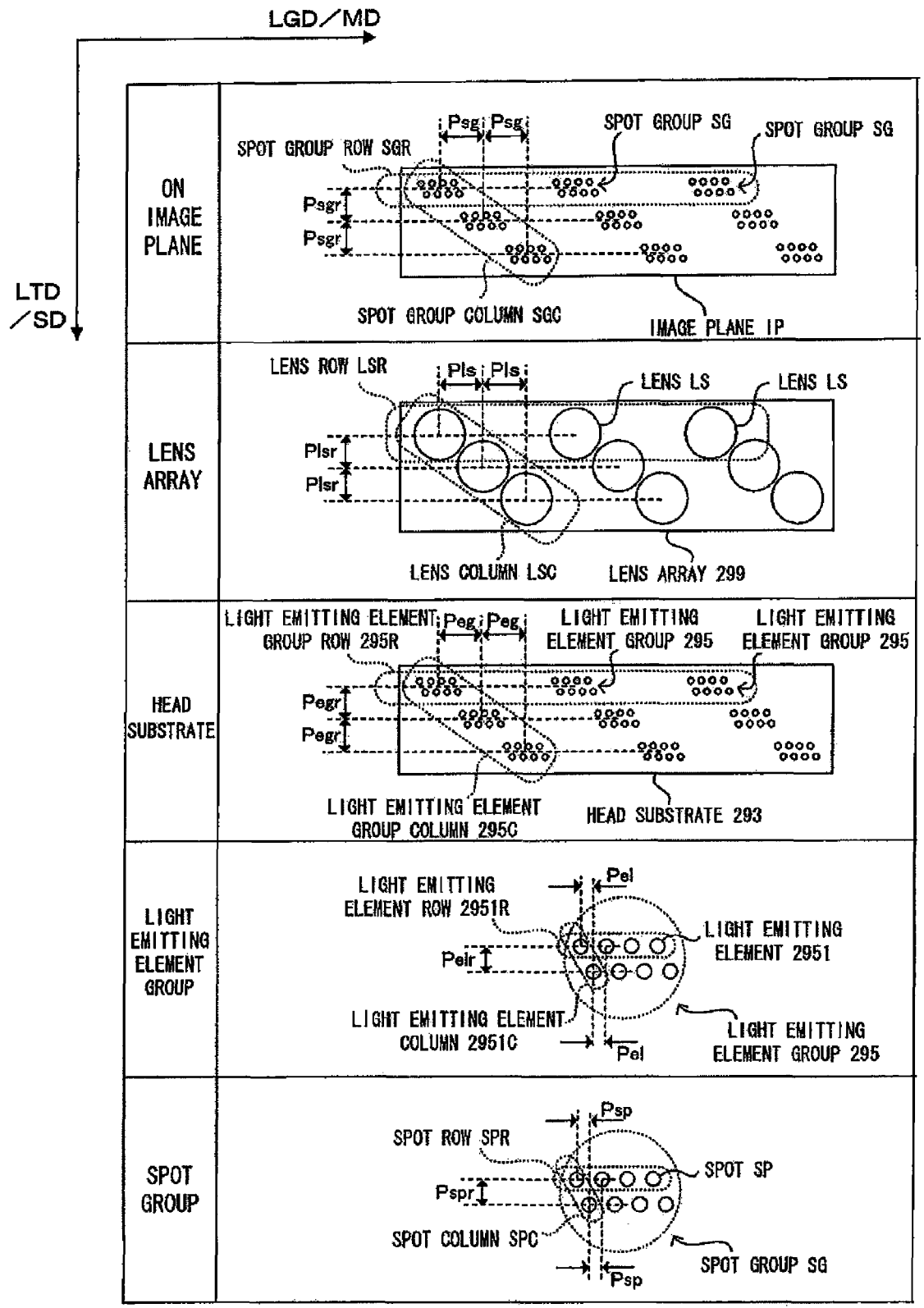

FIGS. 1 and 2 are diagrams showing terminology used in this specification. Here, terminology used in this specification is organized with reference to FIGS. 1 and 2. In this specification, a conveying direction of a surface (image plane IP) of a photosensitive drum 21 is defined to be a sub scanning direction SD and a direction orthogonal to or substantially orthogonal to the sub scanning direction SD is defined to be a main scanning direction MD. Further, a line head 29 is arranged relative to the surface (image plane IP) of the photosensitive drum 21 such that its longitudinal direction LGD corresponds to the main scanning direction MD and its width direction LTD corresponds to the sub scanning direction SD.

Collections of a plurality of (eight in FIGS. 1 and 2) light emitting elements 2951 arranged on the head substrate 293 in one-to-one correspondence with the plurality of lenses LS of the lens array 299 are defined to be light emitting element groups 295. In other words, in the head substrate 293, the plurality of light emitting element groups 295 including a plurality of light emitting elements 2951 are arranged in conformity with the plurality of lenses LS, respectively. Further, collections of a plurality of spots SP formed on the image plane IP by light beams from the light emitting element groups 295 imaged on the image plane IP by the lenses LS corresponding to the light emitting element groups 295 are defined to be spot groups SG. In other words, a plurality of spot groups SG can be formed in one-to-one correspondence with the plurality of light emitting element groups 295. In each spot group SG the most upstream spot in the main scanning direction MD and the sub scanning direction SD is particularly defined to be a first spot. The light emitting element 2951 corresponding to the first spot is particularly defined to be a first light emitting element.

A spot group row SGR and a spot group column SGC are defined as shown in the column "On Image Plane" of FIG. 2. Specifically, a plurality of spot groups SG arranged in the main scanning direction MD are defined as the spot group row SGR. A plurality of spot group rows SGR are arranged at specified spot group row pitches Psgr in the sub scanning direction SD. Further, a plurality of (three in FIG. 2) spot groups SG arranged at spot group row pitches Psgr in the sub scanning direction SD and at spot group pitches Psg in the main scanning direction MD are defined as the spot group column SGC. The spot group row pitch Psgr is a distance in the sub scanning direction SD between the geometric centers of gravity of two spot group rows SGR adjacent in the sub scanning direction SD, and the spot group pitch Psg is a distance in the main scanning direction MD between the geometric centers of gravity of two spot groups SG adjacent in the main scanning direction MD.

Lens rows LSR and lens columns LSC are defined as shown in the column of "Lens Array" of FIG. 2. Specifically, a plurality of lenses LS aligned in the longitudinal direction LGD is defined to be the lens row LSR. A plurality of lens rows LSR are arranged at specified lens row pitches Plsr in the width direction LTD. Further, a plurality of (three in FIG. 2) lenses LS arranged at the lens row pitches Plsr in the width direction LTD and at lens pitches Pls in the longitudinal direction LGD are defined to be the lens column LSC. It should be noted that the lens row pitch Plsr is a distance in the width direction LTD between the geometric centers of gravity of two lens rows LSR adjacent in the width direction LTD, and that the lens pitch Pls is a distance in the longitudinal direction LGD between the geometric centers of gravity of two lenses LS adjacent in the longitudinal direction LGD.

Light emitting element group rows 295R and light emitting element group columns 295C are defined as in the column "Head Substrate" of FIG. 2. Specifically, a plurality of light emitting element groups 295 aligned in the longitudinal direction LGD is defined to be the light emitting element group row 295R. A plurality of light emitting element group rows 295R are arranged at specified light emitting element group row pitches Pegr in the width direction LTD. Further, a plurality of (three in FIG. 2) light emitting element groups 295 arranged at the light emitting element group row pitches Pegr in the width direction LTD and at light emitting element group pitches Peg in the longitudinal direction LGD are defined to be the light emitting element group column 295C. It should be noted that the light emitting element group row pitch Pegr is a distance in the width direction LTD between the geometric centers of gravity of two light emitting element group rows 295R adjacent in the width direction LTD, and that the light emitting element group pitch Peg is a distance in the longitudinal direction LGD between the geometric centers of gravity of two light emitting element groups 295 adjacent in the longitudinal direction LGD.

Light emitting element rows 2951R and light emitting element columns 2951C are defined as in the column "Light Emitting Element Group" of FIG. 2. Specifically, in each light emitting element group 295, a plurality of light emitting elements 2951 aligned in the longitudinal direction LGD is defined to be the light emitting element row 2951R. A plurality of light emitting element rows 2951R are arranged at specified light emitting element row pitches Pelr in the width direction LTD. Further, a plurality of (two in FIG. 2) light emitting elements 2951 arranged at the light emitting element row pitches Pelr in the width direction LTD and at light emitting element pitches Pel in the longitudinal direction LGD are defined to be the light emitting element column 2951C. It should be noted that the light emitting element row pitch Pelr is a distance in the width direction LTD between the geometric centers of gravity of two light emitting element rows 2951R adjacent in the width direction LTD, and that the light emitting element pitch Pel is a distance in the longitudinal direction LGD between the geometric centers of gravity of two light emitting elements 2951 adjacent in the longitudinal direction LGD.

Spot rows SPR and spot columns SPC are defined as shown in the column "Spot Group" of FIG. 2. Specifically, in each spot group SG; a plurality of spots SP aligned in the longitudinal direction LGD is defined to be the spot row SPR. A plurality of spot rows SPR are arranged at specified spot row pitches Pspr in the width direction LTD. Further, a plurality of (two in FIG. 2) spots arranged at the spot row pitches Pspr in the width direction LTD and at spot pitches Psp in the longitudinal direction LGD are defined to be the spot column SPC. It should be noted that the spot row pitch Pspr is a distance in the sub scanning direction SD between the geometric centers of gravity of two spot rows SPR adjacent in the sub scanning direction SD, and that the spot pitch Psp is a distance in the main scanning direction MD between the geometric centers of gravity of two spots SP adjacent in the main scanning direction MD.

B-1. First Embodiment

Figure 3:
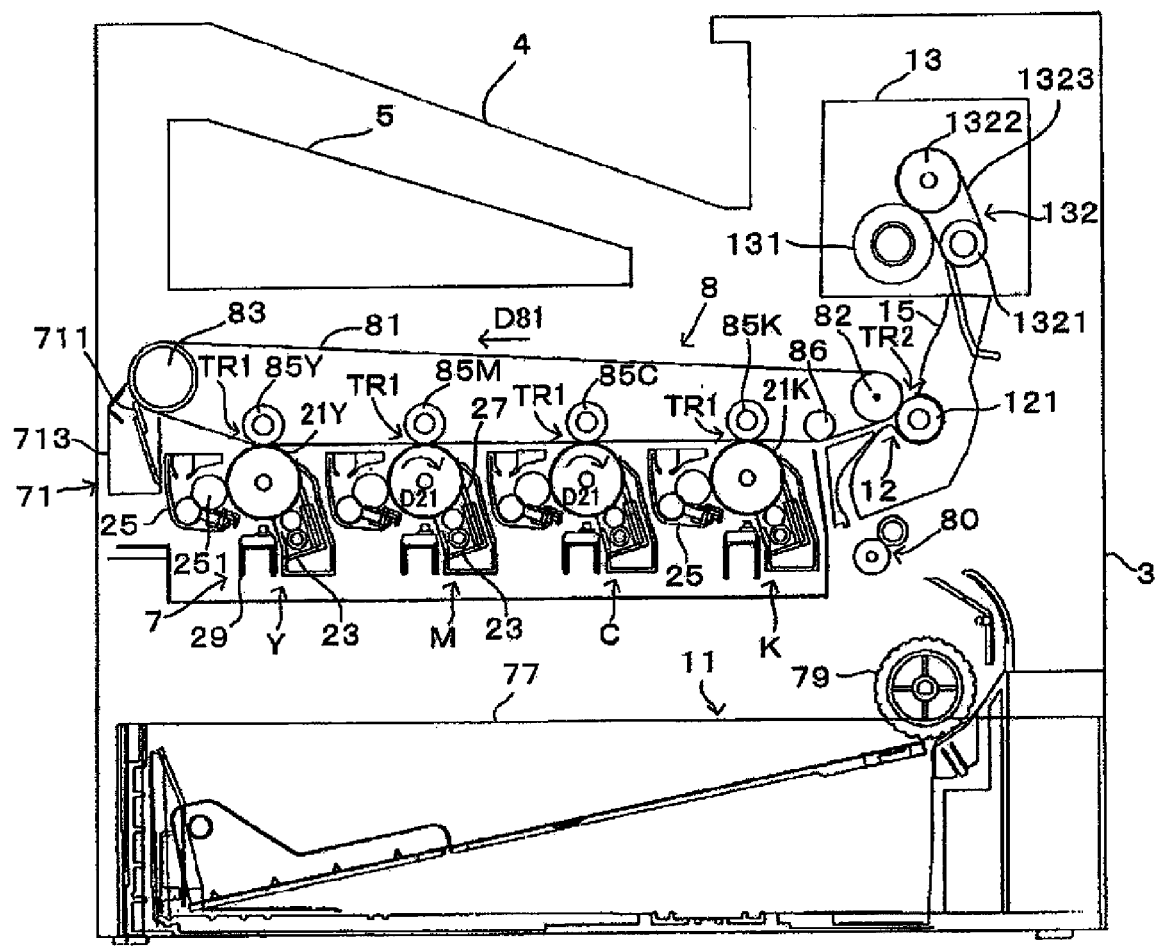
FIG. 3 is a diagram showing an embodiment of an image forming apparatus including a line head as an application subject of the invention.

FIG. 3 is a diagram showing an embodiment of an image forming apparatus including a line head as an application subject of the invention. FIG. 4 is a diagram showing the electrical construction of the image forming apparatus of FIG. 3. This apparatus is an image forming apparatus that can selectively execute a color mode for forming a color image by superimposing four color toners of black (K), cyan (C), magenta (M) and yellow (Y) and a monochromatic mode for forming a monochromatic image using only black (K) toner. FIG. 3 is a diagram corresponding to the execution of the color mode. In this image forming apparatus, when an image formation command is given from an external apparatus such as a host computer to a main controller MC having a CPU and memories, the main controller MC feeds a control signal and the like to an engine controller EC and feeds video data VD corresponding to the image formation command to a head controller HC. This head controller HC controls line heads 29 of the respective colors based on the video data VD from the main controller MC, a vertical synchronization signal Vsync from the engine controller EC and parameter values from the engine controller EC. In this way, an engine part EG performs a specified image forming operation to form an image corresponding to the image formation command on a sheet such as a copy sheet, transfer sheet, form sheet or transparent sheet for OHP.

An electrical component box 5 having a power supply circuit board, the main controller MC, the engine controller EC and the head controller HC built therein is disposed in a housing main body 3 of the image forming apparatus. An image forming unit 7, a transfer belt unit 8 and a sheet feeding unit 11 are also arranged in the housing main body 3. A secondary transfer unit 12, a fixing unit 13 and a sheet guiding member 15 are arranged at the right side in the housing main body 3 in FIG. 3. It should be noted that the sheet feeding unit 11 is detachably mountable into the housing main body 3. The sheet feeding unit 11 and the transfer belt unit 8 are so constructed as to be detachable for repair or exchange respectively.

The image forming unit 7 includes four image forming stations Y (for yellow), M (for magenta), C (for cyan) and K (for black) which form a plurality of images having different colors. Each of the image forming stations Y, M, C and K includes a cylindrical photosensitive drum 21 having a surface of a specified length in a main scanning direction MD. Each of the image forming stations Y, M, C and K forms a toner image of the corresponding color on the surface of the photosensitive drum 21. The photosensitive drum is arranged so that the axial direction thereof is substantially parallel to the main scanning direction MD. Each photosensitive drum 21 is connected to its own driving motor and is driven to rotate at a specified speed in a direction of arrow D21 in FIG. 3, whereby the surface of the photosensitive drum 21 is transported in the sub scanning direction SD which is orthogonal to or substantially orthogonal to the main scanning direction MD. Further, a charger 23, the line head 29, a developer 25 and a photosensitive drum cleaner 27 are arranged in a rotating direction around each photosensitive drum 21. A charging operation, a latent image forming operation and a toner developing operation are performed by these functional sections. Accordingly, a color image is formed by superimposing toner images formed by all the image forming stations Y, M, C and K on a transfer belt 81 of the transfer belt unit 8 at the time of executing the color mode, and a monochromatic image is formed using only a toner image formed by the image forming station K at the time of executing the monochromatic mode. Meanwhile, since the respective image forming stations of the image forming unit 7 are identically constructed, reference characters are given to only some of the image forming stations while being not given to the other image forming stations in order to facilitate the diagrammatic representation in FIG. 3.

The charger 23 includes a charging roller having the surface thereof made of an elastic rubber. This charging roller is constructed to be rotated by being held in contact with the surface of the photosensitive drum 21 at a charging position. As the photosensitive drum 21 rotates, the charging roller is rotated at the same circumferential speed in a direction driven by the photosensitive drum 21. This charging roller is connected to a charging bias generator (not shown) and charges the surface of the photosensitive drum 21 at the charging position where the charger 23 and the photosensitive drum 21 are in contact upon receiving the supply of a charging bias from the charging bias generator.

The line head 29 is arranged relative to the photosensitive drum 21 so that the longitudinal direction thereof corresponds to the main scanning direction MD and the width direction thereof corresponds to the sub scanning direction SD. Hence, the longitudinal direction of the line head 29 is substantially parallel to the main scanning direction MD. The line head 29 includes a plurality of light emitting elements arrayed in the longitudinal direction and is positioned separated from the photosensitive drum 21. Light beams are emitted from these light emitting elements toward the surface of the photosensitive drum 21 charged by the charger 23, thereby forming an electrostatic latent image on this surface.

The developer 25 includes a developing roller 251 carrying toner on the surface thereof. By a development bias applied to the developing roller 251 from a development bias generator (not shown) electrically connected to the developing roller 251, charged toner is transferred from the developing roller 251 to the photosensitive drum 21 to develop the latent image formed by the line head 29 at a development position where the developing roller 251 and the photosensitive drum 21 are in contact.

The toner image developed at the development position in this way is primarily transferred to the transfer belt 81 at a primary transfer position TR1 to be described later where the transfer belt 81 and each photosensitive drum 21 are in contact after being transported in the rotating direction D21 of the photosensitive drum 21.

Further, the photosensitive drum cleaner 27 is disposed in contact with the surface of the photosensitive drum 21 downstream of the primary transfer position TR1 and upstream of the charger 23 with respect to the rotating direction D21 of the photosensitive drum 21. This photosensitive drum cleaner 27 removes the toner remaining on the surface of the photosensitive drum 21 to clean after the primary transfer by being held in contact with the surface of the photosensitive drum.

The transfer belt unit 8 includes a driving roller 82, a driven roller (blade facing roller) 83 arranged to the left of the driving roller 82 in FIG. 3, and the transfer belt 81 mounted on these rollers. The transfer belt unit 8 also includes four primary transfer rollers 85Y, 85M, 85C and 85K arranged to face in a one-to-one relationship with the photosensitive drums 21 of the respective image forming stations Y, M, C and K inside the transfer belt 81 when the photosensitive cartridges are mounted. These primary transfer rollers 85Y, 85M, 85C and 85K are respectively electrically connected to a primary transfer bias generator (not shown). As described in detail later, at the time of executing the color mode, all the primary transfer rollers 85Y, 85M, 85C and 85K are positioned on the sides of the image forming stations Y, M, C and K as shown in FIG. 3, whereby the transfer belt 81 is pressed into contact with the photosensitive drums 21 of the image forming stations Y, M, C and K to form the primary transfer positions TR1 between the respective photosensitive drums 21 and the transfer belt 81. By applying primary transfer biases from the primary transfer bias generator to the primary transfer rollers 85Y, 85M, 85C and 85K at suitable timings, the toner images formed on the surfaces of the respective photosensitive drums 21 are transferred to the surface of the transfer belt 81 at the corresponding primary transfer positions TR1 to form a color image.

On the other hand, out of the four primary transfer rollers 85Y, 85M, 85C and 85K, the color primary transfer rollers 85Y, 85M, 85C are separated from the facing image forming stations Y, M and C and only the monochromatic primary transfer roller 85K is brought into contact with the image forming station K at the time of executing the monochromatic mode, whereby only the monochromatic image forming station K is brought into contact with the transfer belt 81. As a result, the primary transfer position TR1 is formed only between the monochromatic primary transfer roller 85K and the image forming station K. By applying a primary transfer bias at a suitable timing from the primary transfer bias generator to the monochromatic primary transfer roller 85K, the toner image formed on the surface of the photosensitive drum 21 is transferred to the surface of the transfer belt 81 at the primary transfer position TR1 to form a monochromatic image.

The transfer belt unit 8 further includes a downstream guide roller 86 disposed downstream of the monochromatic primary transfer roller 85K and upstream of the driving roller 82. This downstream guide roller 86 is so disposed as to come into contact with the transfer belt 81 on an internal common tangent to the primary transfer roller 85K and the photosensitive drum 21 at the primary transfer position TR1 formed by the contact of the monochromatic primary transfer roller 85K with the photosensitive drum 21 of the image forming station K.

The driving roller 82 drives to rotate the transfer belt 81 in the direction of the arrow D81 and doubles as a backup roller for a secondary transfer roller 121. A rubber layer having a thickness of about 3 mm and a volume resistivity of 1000 kΩ·cm or lower is formed on the circumferential surface of the driving roller 82 and is grounded via a metal shaft, thereby serving as an electrical conductive path for a secondary transfer bias to be supplied from an unillustrated secondary transfer bias generator via the secondary transfer roller 121. By providing the driving roller 82 with the rubber layer having high friction and shock absorption, an impact caused upon the entrance of a sheet into a contact part (secondary transfer position TR2) of the driving roller 82 and the secondary transfer roller 121 is unlikely to be transmitted to the transfer belt 81 and image deterioration can be prevented.

The sheet feeding unit 11 includes a sheet feeding section which has a sheet cassette 77 capable of holding a stack of sheets, and a pickup roller 79 which feeds the sheets one by one from the sheet cassette 77. The sheet fed from the sheet feeding section by the pickup roller 79 is fed to the secondary transfer position TR2 along the sheet guiding member 15 after having a sheet feed timing adjusted by a pair of registration rollers 80.

The secondary transfer roller 121 is provided freely to abut on and move away from the transfer belt 81, and is driven to abut on and move away from the transfer belt 81 by a secondary transfer roller driving mechanism (not shown). The fixing unit 13 includes a heating roller 131 which is freely rotatable and has a heating element such as a halogen heater built therein, and a pressing section 132 which presses this heating roller 131. The sheet having an image secondarily transferred to the front side thereof is guided by the sheet guiding member 15 to a nip portion formed between the heating roller 131 and a pressure belt 1323 of the pressing section 132, and the image is thermally fixed at a specified temperature in this nip portion. The pressing section 132 includes two rollers 1321 and 1322 and the pressure belt 1323 mounted on these rollers. Out of the surface of the pressure belt 1323, a part stretched by the two rollers 1321 and 1322 is pressed against the circumferential surface of the heating roller 131, thereby forming a sufficiently wide nip portion between the heating roller 131 and the pressure belt 1323. The sheet having been subjected to the image fixing, operation in this way is transported to the discharge tray 4 provided on the upper surface of the housing main body 3.

Further, a cleaner 71 is disposed facing the blade facing roller 83 in this apparatus. The cleaner 71 includes a cleaner blade 711 and a waste toner box 713. The cleaner blade 711 removes foreign matters such as toner remaining on the transfer belt after the secondary transfer and paper powder by holding the leading end thereof in contact with the blade facing roller 83 via the transfer belt 81. Foreign matters thus removed are collected into the waste toner box 713. Further, the cleaner blade 711 and the waste toner box 713 are constructed integral to the blade facing roller 83. Accordingly, if the blade facing roller 83 moves as described next, the cleaner blade 711 and the waste toner box 713 move together with the blade facing roller 83.

Figure 5:
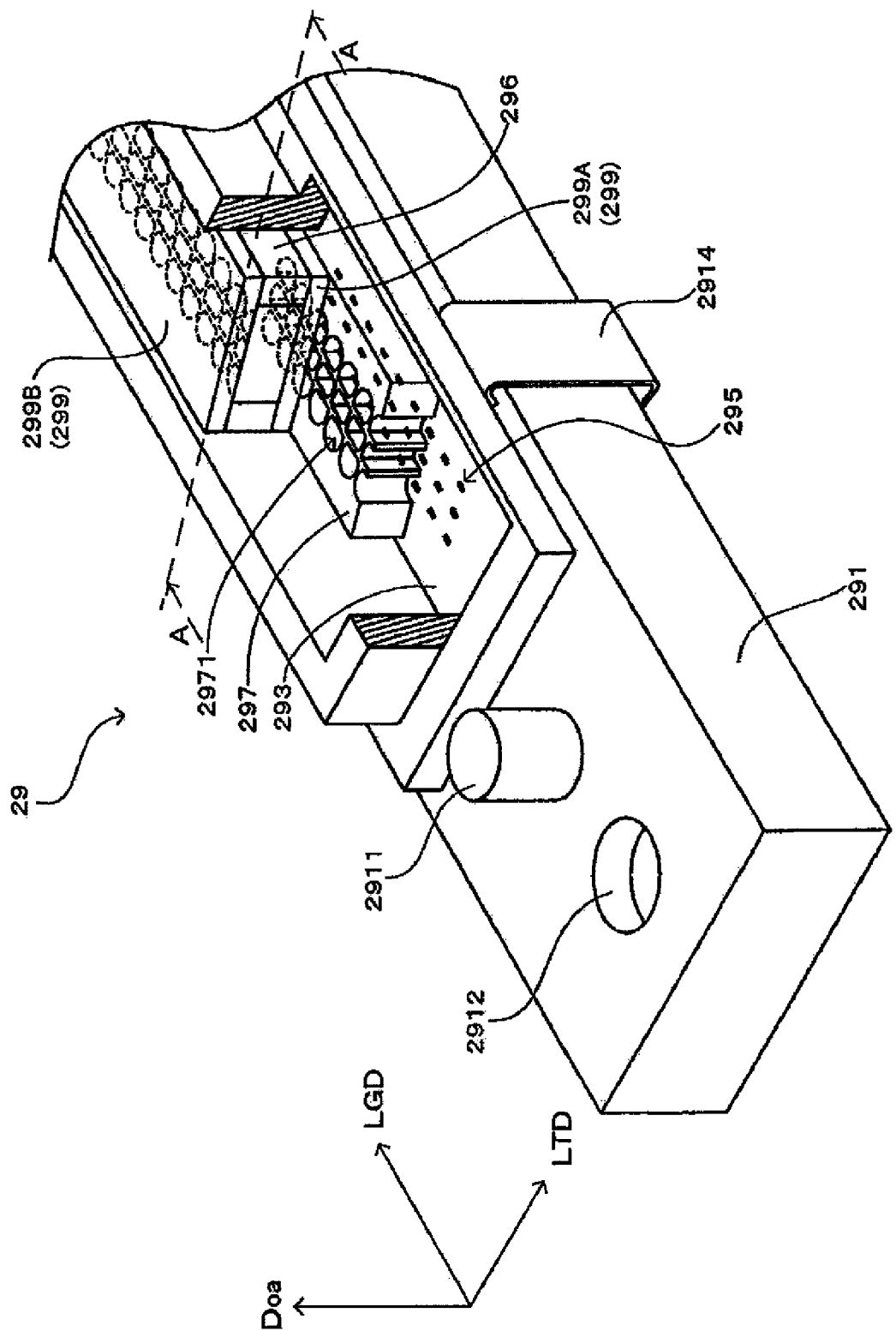
FIG. 5 is a perspective view schematically showing a line head according to the invention.

FIG. 5 is a perspective view schematically showing a line head according to the invention, and FIG. 6 is a partial sectional view along a width direction of the line head shown in FIG. 5 in which the cross section is parallel to the optical axis of the lens. As described above, the line head 29 is arranged relative to the photosensitive drum 21 such that the longitudinal direction LGD thereof corresponds to the main scanning direction MD and the width direction LTD thereof corresponds to the sub scanning direction SD. The longitudinal direction LGD and the width direction LTD are orthogonal to or substantially orthogonal to each other. As described later, in this line head 29, a plurality of light emitting elements are formed on the head substrate 293 and the respective light emitting elements emit light beams toward the surface of the photosensitive drum 21. Accordingly, in this specification, a direction orthogonal to the longitudinal direction LGD and to the width direction LTD and propagating from the light emitting elements toward the photosensitive drum surface is referred to as a light beam propagation direction Doa. This light beam propagation direction Doa is parallel to or substantially parallel to optical axes OA to be described later.

The line head 29 includes a case 291, and a positioning pin 2911 and a screw insertion hole 2912 are provided at each of the opposite ends of such a case 291 in the longitudinal direction LGD. The line head 29 is positioned relative to the photosensitive drum 21 by fitting such positioning pins 2911 into positioning holes (not shown) perforated in a photosensitive drum cover (not shown) covering the photosensitive drum 21 and positioned relative to the photosensitive drum 21. Further, the line head 29 is positioned and fixed relative to the photosensitive drum 21 by screwing fixing screws into screw holes (not shown) of the photosensitive drum cover via the screw insertion holes 2912 to be fixed.

The head substrate 293, a light shielding member 297 and two lens arrays 299 (299A, 299B) are arranged in the case 291. The inner side of the case 291 is held in contact with a top surface 293-$h$ of the head substrate 293, whereas an under lid 2913 is held in contact with an under surface 293-$t$ of the head substrate 293. This under lid 2913 is pressed against the inner side of the case 291 via the head substrate 293 by fixing devices 2914. In other words, the fixing devices 2914 have elastic forces for pressing the under lid 2913 toward the inner side (upper side in FIG. 6) of the case 291 and the interior of the case 291 is light-tightly sealed (in other words, so that light does not leak from the interior of the case 291 and light does not enter the case 291 from the outside) by the under lid being pressed by such elastic forces. The fixing devices 2914 are provided at a plurality of positions spaced apart in the longitudinal direction LGD of the case 291.

The light emitting element groups 295 formed by grouping a plurality of light emitting elements are provided on the under surface 293-$t$ of the head substrate 293. The head substrate 293 is made of a light transmissive material such as glass, and light beams emitted from the respective light emitting elements of the light emitting element groups 295 can transmit from the under surface 293-$t$ of the head substrate 293 to the top surface 293-$h$ thereof. These light emitting elements are bottom emission-type organic EL (electro-luminescence) devices and are covered by a sealing member 294. The detailed arrangement of the light emitting elements on the under surface 293-$t$ of the head substrate 293 is as follows.

Figure 7:
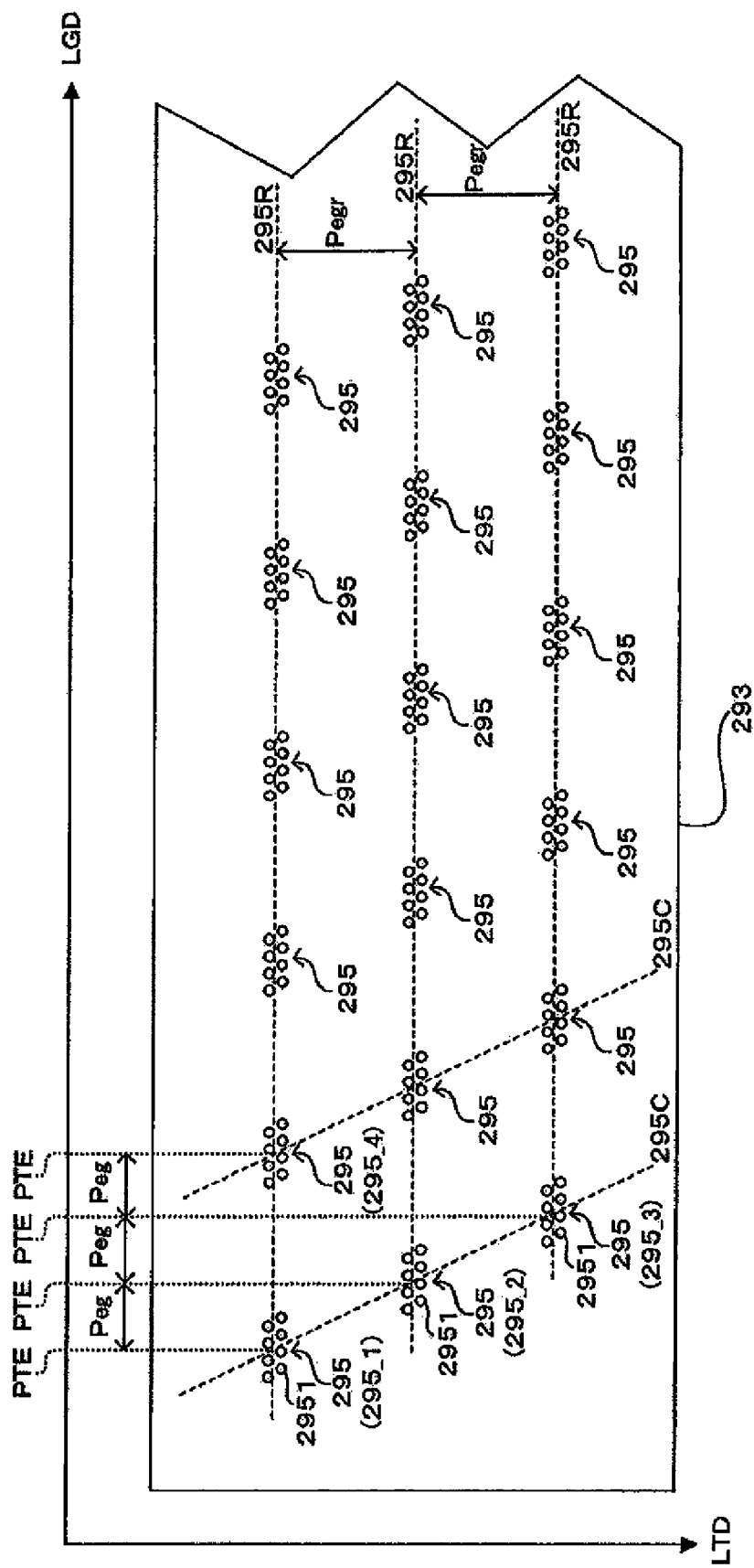
FIG. 7 is a diagram showing the configuration of the under surface of the head substrate.
Figure 8:
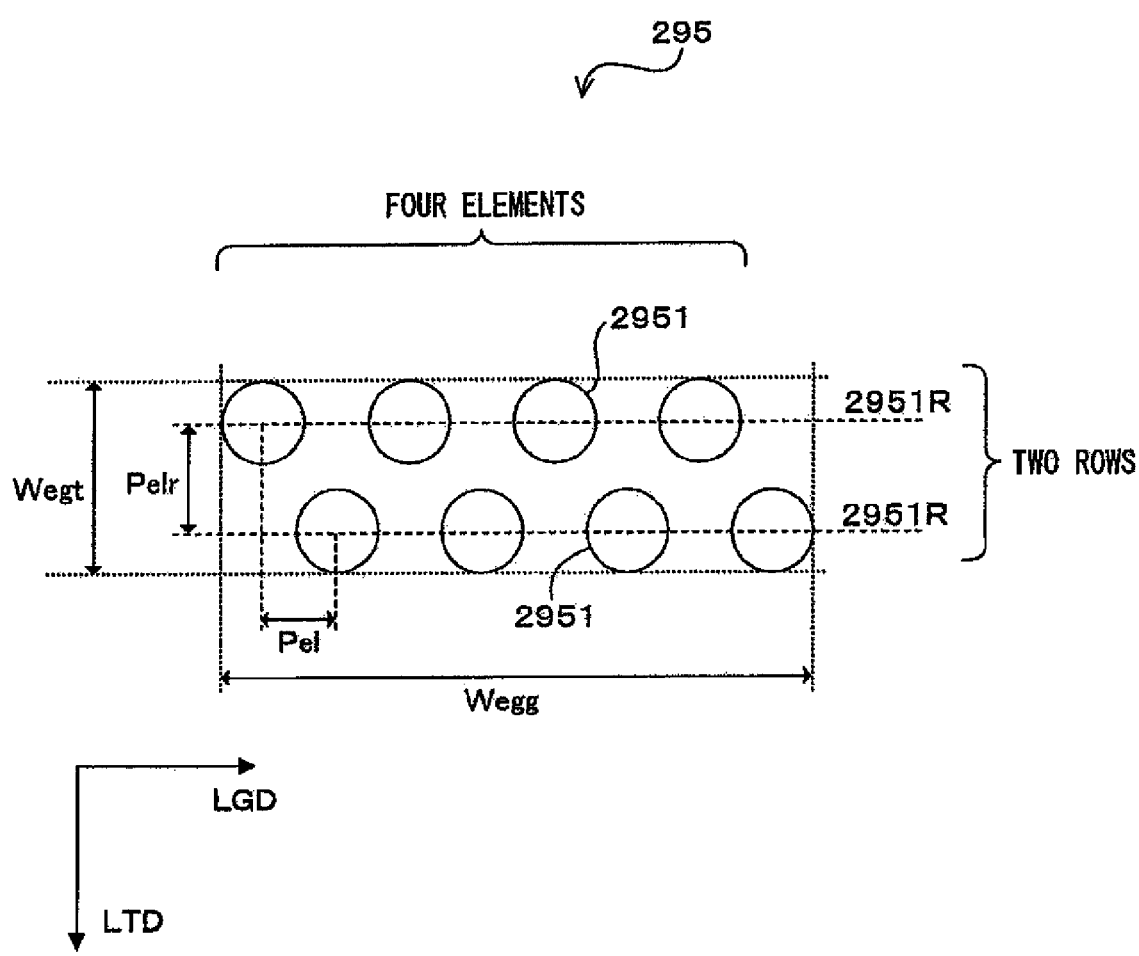
FIG. 8 is a diagram showing the configuration of the light emitting element group provided on the under surface of the head substrate.

FIG. 7 is a diagram showing the configuration of the under surface of the head substrate and corresponds to a case where the under surface is seen from the top surface of the head substrate. FIG. 8 is a diagram showing the configuration of the light emitting element group provided on the under surface of the head substrate. As shown in FIG. 7, the light emitting element group 295 is formed by grouping eight light emitting elements 2951. In each light emitting element group 295, eight light emitting elements 2951 are arranged as follows. Specifically, as shown in FIG. 8, in the light emitting element group 295, four light emitting elements 2951 are aligned in the longitudinal direction LGD to form a light emitting element row 2951R and two light emitting element rows 2951R are arranged at a light emitting element row pitch Pelr in the width direction LTD. The respective light emitting element rows 2951R are displaced from each other in the longitudinal direction LGD by a light emitting element pitch Pel, so that the positions of the respective light emitting elements 2951 in the longitudinal direction LGD differ from each other. The light emitting element group 295 thus configured has a longitudinal width Wegg in the longitudinal direction LGD and a widthwise width Wegt in the width direction LTD, wherein the longitudinal width Wegg is larger than the widthwise width Wegt.

A plurality of light emitting element groups 295 thus configured are arranged on the under surface 293-$t$ of the head substrate 293. Specifically, three light emitting element groups 295 are arranged at positions mutually different in the width direction LTD to form a light emitting element group column 295C, and a plurality of light emitting element group columns 295C are arranged in the longitudinal direction LGD. In each light emitting element group column 295C, three light emitting element groups 295 are displaced from each other by the light emitting element group pitch Peg in the longitudinal direction LGD, with the result that positions PTE of the respective light emitting element groups 295 in the longitudinal direction LGD differ from each other. In other words, on the under surface 2934 of the head substrate 293, a plurality of light emitting element groups 295 are aligned in the longitudinal direction LGD to form a light emitting element group row 295R, and three light emitting element group rows 295R are arranged at the light emitting element group row pitches. Peg in the width direction LTD. Further, the respective light emitting element group rows 295R are displaced from each other by the light emitting element group pitch Peg in the longitudinal direction LGD, with the result that the positions PTE of the respective light emitting element groups 295 in the longitudinal direction LGD differ from each other. Thus, in this embodiment, a plurality of light emitting element groups 295 are two-dimensionally arranged on the head substrate 293. In FIG. 7, the positions of the light emitting element groups 295 are represented by the center of gravity positions of the light emitting element groups 295, and the positions PTE of the light emitting element groups 295 in the longitudinal direction LGD are indicated by feet of perpendiculars to an axis of the longitudinal direction LGD from the positions of the light emitting element groups 295.

The respective light emitting elements 2951 formed on the head substrate 293 in this way emit light beams having an equal wavelength upon being driven, for example, by a TFT (thin film transistor) circuit or the like. The light emitting surfaces of the light emitting elements 2951 are so-called perfectly diffusing surface illuminants and the light beams emitted from the light emitting surfaces comply with Lambert's cosine law.

Referring back to FIGS. 5 and 6, description continues. The light shielding member 297 is arranged in contact with the top surface 293-$h$ of the head substrate 293. The light shielding member 297 is provided with light guide holes 2971 for the respective plurality of light emitting element groups 295. In other words, a plurality of light guide holes 2971 are formed in a one-to-one correspondence with the plurality of light emitting element groups 295. The light guide holes 2971 are formed as holes penetrating the light shielding member 297 in the light beam propagation direction Doa. Further, two lens arrays 299 are arranged side by side in the light beam propagation direction Doa above the light shielding member 297 (at a side opposite to the head substrate 293).

As described above, the light shielding member 297 provided with the light guide holes 2971 for the respective light emitting element groups 295 is arranged between the light emitting element groups 295 and the lens arrays 299 in the light beam propagation direction Doa. Accordingly, light beams emitted from the light emitting element groups 295 propagate toward the lens arrays 299 through the light guide holes 2971 corresponding to the light emitting element groups 295. Conversely speaking, out of the light beams emitted from the light emitting element groups 295, those propagating toward other than the light guide holes 2971 corresponding to the light emitting element groups 295 are shielded by the light shielding member 297. In this way, all the lights emitted from one light emitting element group 295 propagate toward the lens arrays 299 via the same light guide hole 2971 and the mutual interference of the light beams emitted from different light emitting element groups 295 is prevented by the light shielding member 297.

Figure 9:
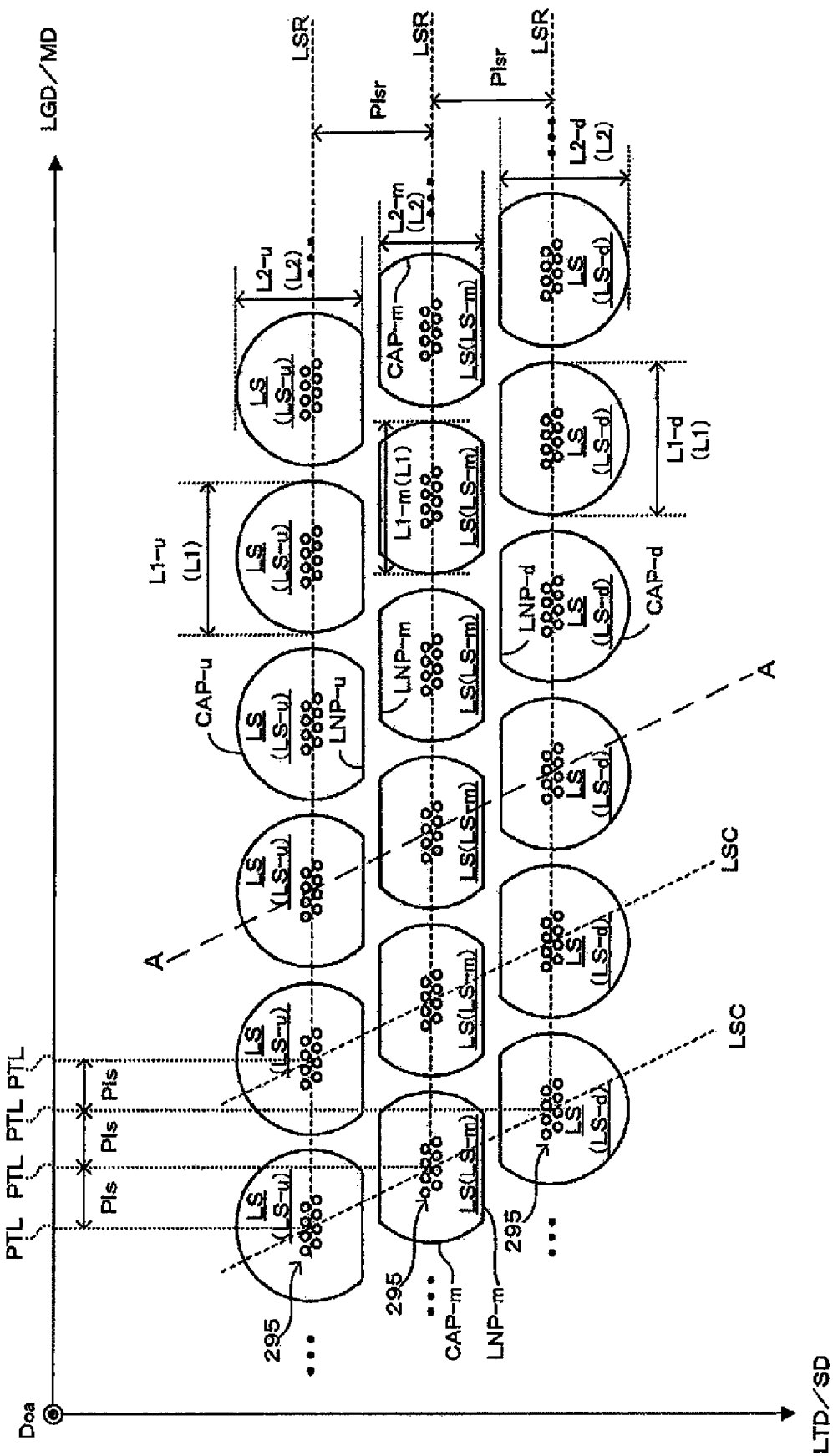
FIG. 9 is a plan view of the lens array according to this embodiment.

FIG. 9 is a plan view of the lens array according to this embodiment and corresponds to a case where the lens array is seen from an image plane side (in the light beam propagation direction Doa). The respective lenses LS in FIG. 9 are formed on an under surface 2991-$t$ of a lens array substrate 2991 and the construction of this lens array substrate under surface 29914 is shown in FIG. 9. Although the light emitting element groups 295 are shown in FIG. 9, this is to show a correspondence relationship of the light emitting element groups 295 and the lenses LS and the light emitting element groups 295 are not formed on the lens array substrate under surface 2991-$t$. As shown in FIG. 9, one lens LS is provided for each light emitting element group 295 in the lens array 299. Specifically, in the lens array 299, three lenses LS are arranged at different positions in the width direction LTD to form a lens column LSC, and a plurality of lens columns LSC are arranged in the longitudinal direction LGD. In each lens column LSC, three lenses LS are displaced from each other by the lens pitch Pls, with the result that positions PTL of the respective lenses LS in the longitudinal direction LGD differ from each other. In other words, in the lens array 299, a plurality of lenses LS are aligned in the longitudinal direction LGD to form a lens row LSR, and three lens rows LSR are arranged at the lens row pitch Plsr in the width direction LTD. The respective lens rows LSR are displaced from each other by the lens pitch Pls in the longitudinal direction LGD, and the positions PTL of the respective lenses LS in the longitudinal direction LGD differ from each other. In this way, the plurality of lenses LS are two-dimensionally arranged in the lens array 299. In FIG. 9, the positions of the lenses LS are represented by the tops of the lenses LS (that is, points where sag is maximum) and the positions PTL of the lenses LS in the longitudinal direction LGD are represented by feet of perpendiculars to the axis in the longitudinal direction LGD from the tops of the lenses LS.

As shown in FIG. 9, the most upstream lens row LSR in the width direction LTD is made up of upstream lenses LS-u. The outer periphery of each upstream lens LS-u includes an arcuate portion CAP-u convex toward the upstream side in the width direction LTD and a straight portion LNP-u extending in the longitudinal direction LGD and is substantially fan-shaped. When the length of the upstream lenses LS-u in the longitudinal direction LGD is an upstream lens longitudinal direction length L1-$u$ (lens longitudinal direction length L1) and the length of the upstream lenses LS-u in the width direction LTD is an upstream lens width direction length L2-$u$ (lens width direction length L2), the upstream lenses LS-u are formed so that the following formula:

$$L1\text{-}u > L2\text{-}u$$

is satisfied. Further, the shape of the light guide holes 2971 formed corresponding to the upstream lenses LS-u is also substantially fan-shaped (FIG. 5).

The middle lens row LSR in the width direction LTD is made up of middle lenses LS-m. The outer periphery of each middle lens LS-m includes arcuate portions CAP-m located at the opposite ends in the longitudinal direction LGD and convex toward outer sides and straight portions LNP-m located at the opposite ends in the width direction LTD and extending in the longitudinal direction LGD and is shaped to be substantially flat in the longitudinal direction LGD. When the length of the middle lenses LS-m in the longitudinal direction LGD is a middle lens longitudinal direction length L1-$m$ (lens longitudinal direction length L1) and the length of the middle lenses LS-m in the width direction LTD is a middle lens width direction length L2-$m$ (lens width direction length L2), the middle lenses LS-m are formed so that the following formula:

$$L1\text{-}m > L2\text{-}m$$

is satisfied. Further, the shape of the light guide holes 2971 formed corresponding to the middle lenses LS-m is also flat (FIG. 5).

The most downstream lens row LSR in the width direction LTD is made up of downstream lenses LS-d. The outer periphery of each downstream lens LS-d includes an arcuate portion CAP-d convex toward the downstream side in the width direction LTD and a straight portion LNP-d extending in the longitudinal direction LGD and is substantially reversed fan-shaped. When the length of the downstream lenses LS-d in the longitudinal direction LGD is a downstream lens longitudinal direction length L1-$d$ (lens longitudinal direction length L1) and the length of the downstream lenses LS-d in the width direction LTD is a downstream lens width direction length L2-$d$ (lens width direction length L2), the downstream lenses LS-d are formed so that the following formula:

$$L1\text{-}d > L2\text{-}d$$

is satisfied. Further, the shape of the light guide holes 2971 formed corresponding to the downstream lenses LS-d is also substantially reversed fan-shaped (FIG. 5).

Figure 10:
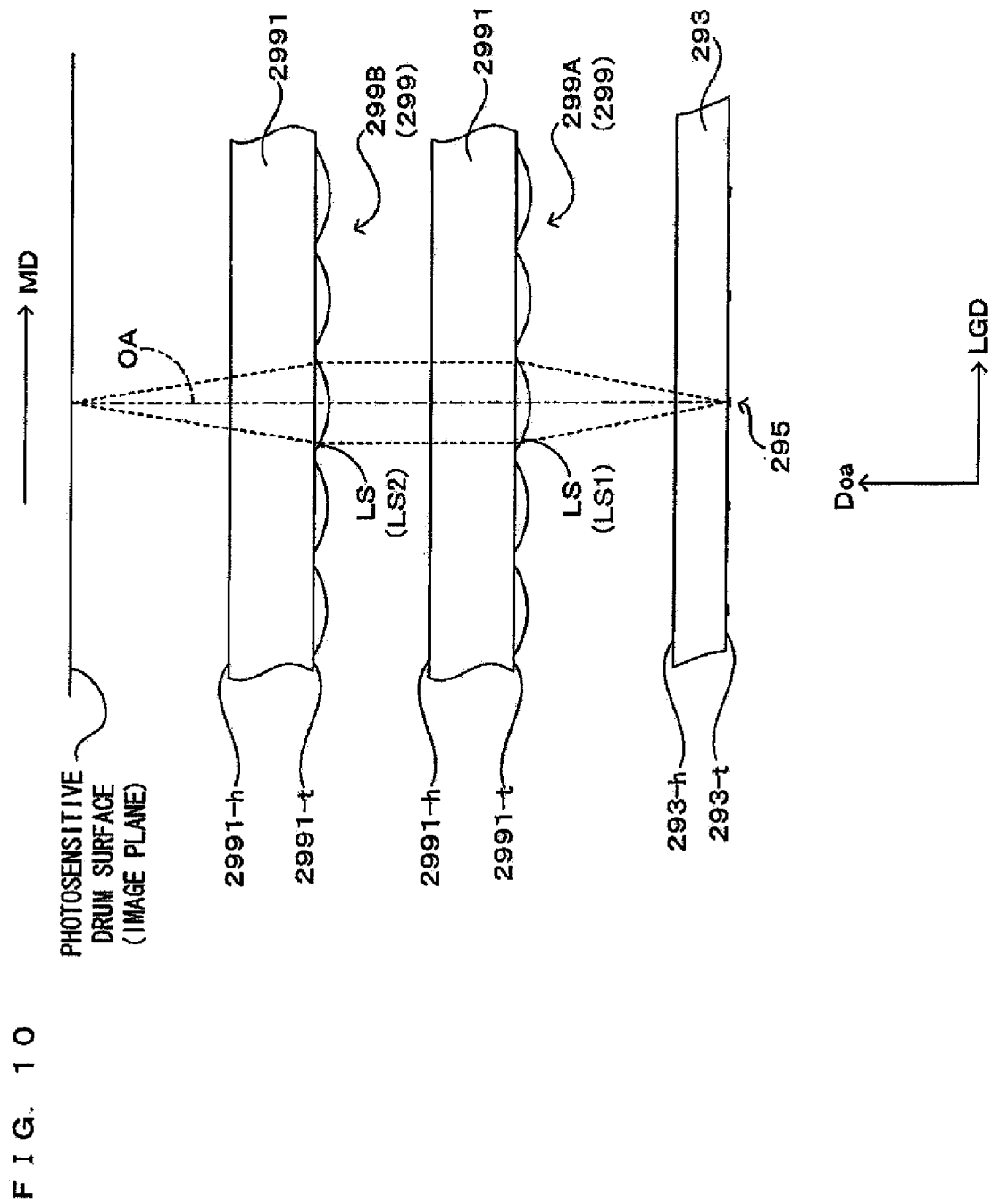
FIG. 10 is a longitudinal sectional view of the lens arrays, the head substrate and the like showing a longitudinal cross section including an optical axis of the lens formed in the lens array.

FIG. 10 is a longitudinal sectional view of the lens arrays, the head substrate and the like showing a longitudinal cross section including an optical axis of the lens LS formed in the lens array. The lens array 299 includes the light transmissive lens array substrate 2991 long in the longitudinal direction LGD. In this embodiment, this lens array substrate 2991 is made of a glass having a relatively small linear expansion coefficient. Out of a top surface 2991-$h$ and the under surface 2991-$t$ of the lens array substrate 2991, the lenses LS are formed on the top surface 2991-$h$ of the lens array substrate 2991. This lens array 299 is formed by a method disclosed in JP-A-2005-276849 for example. Specifically, a mold formed with recesses in conformity with the shape of the lenses LS is held in contact with a glass substrate as a lens substrate 2991. A clearance between the mold and the light transmissive substrate is filled with a light curing resin. When light is irradiated to this light curing resin, the light curing resin is cured and the lenses LS are formed on the light transmissive substrate. After the lenses are formed by solidifying the light curing resin, the mold is released.

As described above, in this embodiment, the lens array 299 is made up of the lens array substrate 2991 and the lenses LS. Accordingly, a degree of freedom in the construction of the lens array 299 is improved, for example, by enabling the selection of different base materials for the lens array substrate 2991 and the lenses LS. Thus, the lens array 299 can be appropriately designed depending on specification required for the line head 29 and a good exposure by the line head 29 can be easily realized. Further, in this embodiment, the lenses LS are made of the light curing resin that can be quickly cured upon light irradiation. Accordingly, the lenses LS can be easily formed, wherefore the cost of the lens array 299 can be reduced by simplifying the production process of the lens array 299. Furthermore, since the lens array substrate 2991 is made of glass having a small linear expansion coefficient, a good exposure can be realized independently of temperature by suppressing the deformation of the lens array 299 caused by a temperature change.

In this line head 29, two lens arrays 299 (299A, 299B) having such a configuration are arranged side by side in the light beam propagation direction Doa. These two lens arrays 299A, 29913 are opposed to each other with a pedestal 296 located therebetween, and this pedestal 296 fulfills a function of specifying the spacing between the lens arrays 299A, 299B. Thus, in this embodiment, two lenses LS1, LS2 aligned in the light propagation direction Doa are arranged for each light emitting element group 295 (FIGS. 5, 6 and 10). An optical axis OA (chain double-dashed line in FIG. 10) passing the centers of the first and second lenses LS1, LS2 corresponding to the same light emitting element group 295 is orthogonal to or substantially orthogonal to the under surface 293-$t$ of the head substrate 293. Here, the lens LS of the line head 299A upstream in the light beam propagation direction Doa is the first lens LS1, and that of the line head 299B downstream in the light beam propagation direction Doa is the second lens LS2. In this embodiment, since a plurality of lens arrays 299 are arranged side by side in the light beam propagation direction Doa, a degree of freedom in optical design can be increased.

As described above, the line head 29 is provided with an imaging optical system including the first and the second lenses LS1, LS2. Accordingly, light beams emitted from the light emitting element groups 295 are imaged by the first and the second lenses. LS1, LS2 to form spots SP on the photosensitive drum surface (image plane). On the other hand, the photosensitive drum surface is charged by the charger 23 prior to spot formation as described above. Thus, areas where the spots SP are formed are neutralized to form spot latent images Lsp. The spot latent images Lsp thus formed are conveyed toward a downstream side in the sub scanning direction SD while being carried on the photosensitive drum surface. As described next, the spots SP are formed at timings in conformity with the movement of the photosensitive drum surface to form a plurality of spot latent images Lsp aligned in the main scanning direction MD.

Figure 11:
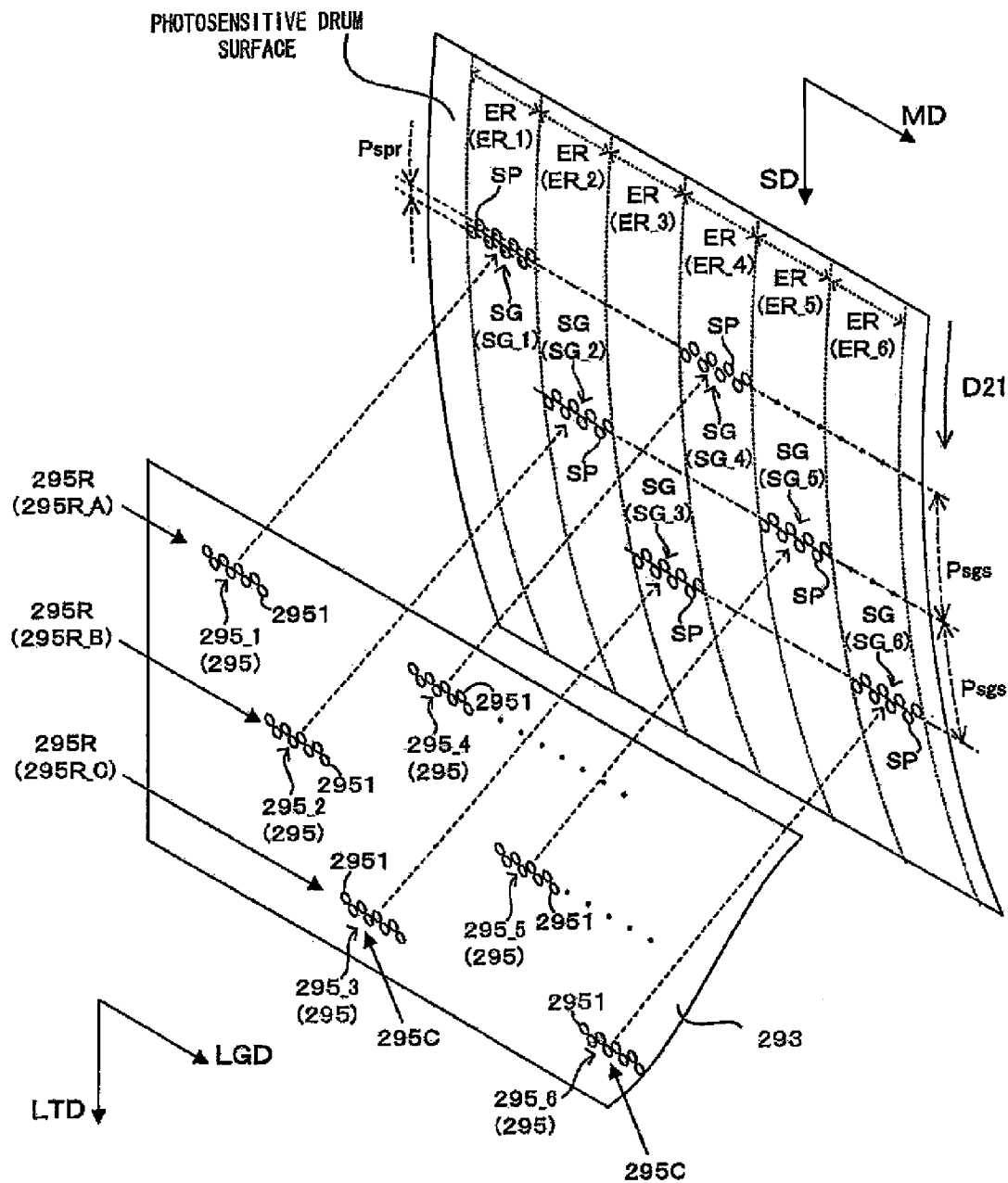
FIG. 11 is a perspective view showing spots formed by the line head.

FIG. 11 is a perspective view showing spots formed by the line head. The lens array 299 is not shown in FIG. 11. As shown in FIG. 11, the respective light emitting element groups 295 can form the spot groups SG in exposure regions ER mutually different in the main scanning direction MD. Here, the spot group SG is a set of a plurality of spots SP formed by the simultaneous light emissions of all the light emitting elements 2951 of the light emitting element group 295. As shown in FIG. 11, three light emitting element groups 295 capable of forming the spot groups SG in the exposure regions ER consecutive in the main scanning direction MD are displaced from each other in the width direction LTD. In other words, three light emitting element groups 295_1, 295_2 and 295_3 capable of forming spot groups SG_1, SG_2 and SG_3, for example, in exposure regions ER_1, ER_2 and ER_3 consecutive in the main scanning direction MD are displaced from each other in the width direction LTD. These three light emitting element groups 295 constitute the light emitting element group column 295C, and a plurality of light emitting element group columns 295C are arranged in the longitudinal direction LGD. As a result, three light emitting element group rows 295R_A, 295R_B and 295R_C are arranged in the width direction LTD and the respective light emitting element group rows 295R_A, etc. form the spot groups SG at positions mutually different in the sub scanning direction SD as already described in the description of FIG. 7.

Specifically, in this line head 29, the plurality of light emitting element groups 295 (for example, light emitting element groups 295_1, 295_2, 295_3) are arranged at positions mutually different in the width direction LTD. The respective light emitting element groups 295 arranged at the positions mutually different in the width direction LTD form spot groups SG (for example, spot groups SG_1, SG_2, SG_3) at positions mutually different in the sub scanning direction SD.

In other words, in this line head 29, the plurality of light emitting elements 2951 are arranged at positions mutually different in the width direction LTD. For example, the light emitting elements 2951 belonging to the light emitting element group 295_1 and those belonging to the light emitting element group 295_2 are arranged at positions mutually different in the width direction LTD. The respective light emitting elements 2951 arranged at the positions mutually different in the width direction LTD form spots SP at positions mutually different in the sub scanning direction SD. For example, spots SP belonging to the spot group SG_1 and those belonging to the spot group SG_2 are formed at positions mutually different in the sub scanning direction SD.

In this way, the formation positions of the spots SP in the sub scanning direction SD differ depending on the light emitting elements 2951. Accordingly, in order to form a plurality of spot latent images Lsp side by side in the main scanning direction MD (that is, in order to form a plurality of spot latent images Lsp side by side at the same position in the sub scanning direction SD), differences in such spot formation positions need to be considered. Thus, in this line head 29, the respective light emitting elements 2951 are driven at timings in conformity with the movement of the photosensitive drum surface.

Figure 12:
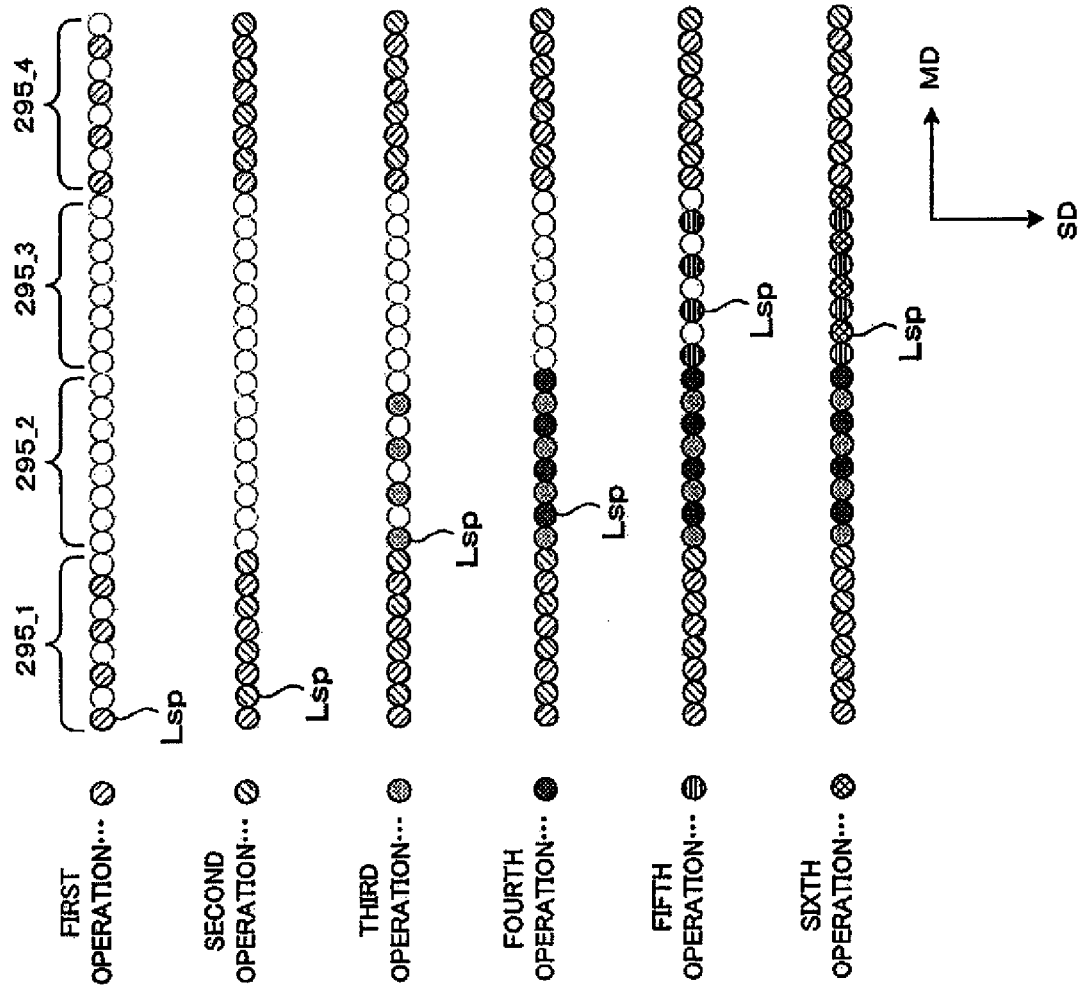
FIG. 12 is a diagram showing a spot forming operation by the above line head.

FIG. 12 is a diagram showing a spot forming operation by the above line head. The spot forming operation by the line head is described with reference to FIGS. 7, 11 and 12. Briefly, the photosensitive drum surface (latent image carrier surface) is moved in the sub scanning direction SD and the head control module 54 (FIG. 4) drives the light emitting elements 2951 for light emission at timings in conformity with the movement of the photosensitive drum surface, whereby a plurality of spot latent images Lsp arranged in the main scanning direction MD are formed.

First of all, out of the light emitting element rows 2951R (FIG. 11) belonging to the most upstream light emitting element groups 295_1, 295_4, and the like in the width direction LTD, the light emitting element rows 2951R downstream in the width direction LTD are driven for light emission. A plurality of light beams emitted by such a light emitting operation are imaged by the lenses LS to form spots SP on the photosensitive drum surface. The lenses LS have an inversion characteristic, so that the light beams from the light emitting elements 2951 are imaged in an inverted manner. In this way, spot latent images Lsp are formed at hatched positions of a "First Operation" of FIG. 12. In FIG. 12, white circles represent spots that are not formed yet, but planned to be formed later. In FIG. 12, spots labeled by reference numerals 295_1 to 295_4 are those to be formed by the light emitting element groups 295 corresponding to the respective attached reference numerals.

Subsequently, out of the light emitting element rows 2951R belonging to the most upstream light emitting element groups 295_1, 295_4, and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Second Operation" of FIG. 12. Here, the light emitting element rows 2951R are successively driven for light emission from the one downstream in the width direction LTD in order to deal with the inversion characteristic of the lenses LS.

Subsequently, out of the light emitting element rows 2951R belonging to the second most upstream light emitting element groups 295_2 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Third Operation" of FIG. 12.

Subsequently, out of the light emitting element rows 2951R belonging to the second most upstream light emitting element groups 295_2 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fourth Operation" of FIG. 12.

Subsequently, out of the light emitting element rows 2951R belonging to the third most upstream light emitting element groups 295_3 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fifth Operation" of FIG. 12.

Finally, out of the light emitting element rows 2951R belonging to the third most upstream light emitting element groups 295_3 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Sixth Operation" of FIG. 12. By performing the first to sixth light emitting operations in this way, a plurality of spots SP are successively formed from the upstream ones in the sub scanning direction SD to form a plurality of spot latent images Lsp aligned in the main scanning direction MD.

As described above, in this embodiment, the lens LS is formed to satisfy the following formula:

$$L1 > L2$$

where L1 (lens longitudinal direction length) denotes the length of each lens LS in the longitudinal direction and L2 (lens width direction length) thereof in the width direction. In other words, the length of each lens in the width direction LTD is set to be shorter, whereas the length thereof in the longitudinal direction LGD is set to be longer. Accordingly, larger quantities of lights can be incident on the lenses in the longitudinal direction LGD while pitches (corresponding to the lens row pitch Plsr) between the lenses in the width direction. LTD are suppressed. Therefore, in this embodiment, the line head 29 can be miniaturized while a good exposure at a high resolution is enabled.

As described with reference to FIGS. 11 and 12, the surface of the photosensitive drum (surface of the latent image carrier) is moved in the sub scanning direction SD (second direction) in this embodiment. The light emitting elements 2951 of the line head 29 are driven for light emission at timings in conformity with the movement of the surface of the photosensitive drum 21 to expose the surface of the photosensitive drum 21. In other words, light beams are successively imaged by the lens rows LSR from the most upstream one in the width direction LTD (sub scanning direction SD) to form spot latent images Lsp. There are cases where the circumferential speed of the photosensitive drum 21 varies due to the eccentricity of the photosensitive drum 21 or the like. Specifically, the above circumferential speed may vary until the next lens row forms spot latent images Lsp after a certain lens row LSR forms spot latent images Lsp. As a result, there were cases where the formation positions of the spot latent images Lsp were displaced in the width direction LTD between the lens rows LSR and the spot latent images Lsp could not be aligned in the main scanning direction MD. The larger the lens row pitch Plsr is, the larger the displacements of the spot latent image formation positions in the width direction LTD tend to be. In contrast, in the above embodiment, the pitches between the lenses LS in the width direction LTD (corresponding to the lens row pitch Plsr) are suppressed and relatively short. Thus, even if the circumferential speed should vary, the influence of this circumferential speed variation on the latent image forming operation can be suppressed, which makes it possible to realize good exposure and latent image forming operation.

In the above embodiment, organic EL devices are used as the light emitting elements 2951 and these organic EL devices have smaller light quantities as compared with LEDs (light emitting diodes) and the like. Hence, the light quantities introduced to the lenses LS tend to decrease. Particularly, in the case of using bottom emission-type organic EL devices, light beams emitted from the organic EL devices are partly absorbed by the head substrate 293. Thus, the light quantities introduced to the lenses LS are further decreased. However, since the lenses. LS are shaped to be long in the longitudinal direction LGD (first direction) in this embodiment, larger quantities of lights can be incident on the lenses LS. Therefore, a good exposure is possible even in a construction using bottom emission-type organic EL devices as the light emitting elements 2951.

B-2. Second Embodiment

Figure 13:
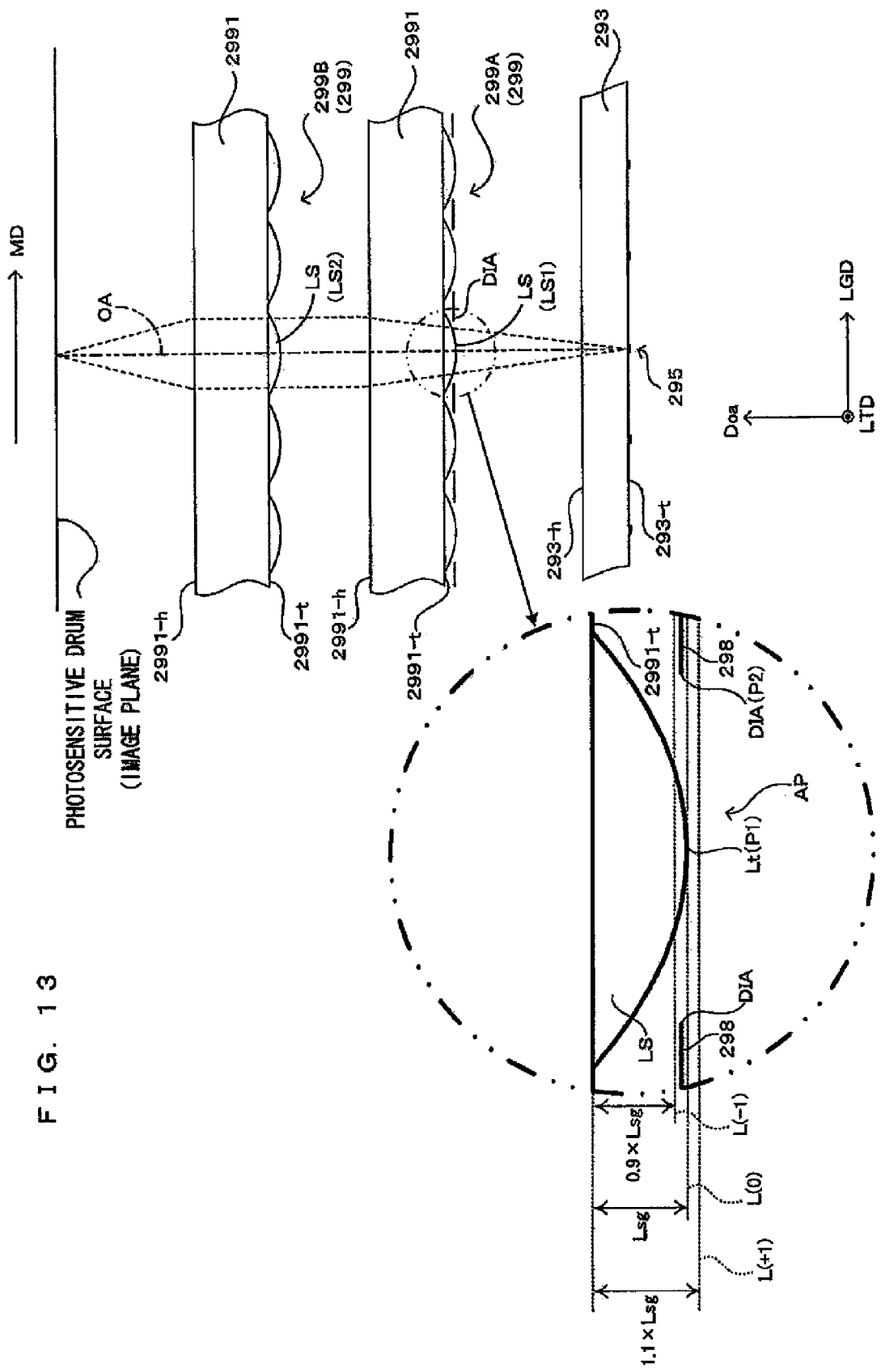
FIG. 13 is a partial sectional view showing a second embodiment of the invention.

FIG. 13 is a partial sectional view showing a second embodiment of the invention. In FIG. 13, a construction shown in a large chain double-dashed line circle is the enlargement of a construction shown in a small chain double-dashed line circle. As shown in FIG. 13, lenses LS1, LS2 formed on two lens arrays 299A, 299B are convex toward light emitting element groups 295. In other words, surfaces of the lenses LS facing the light emitting element groups 295 (light emitting elements 2951) are convex surfaces. In this second embodiment, diaphragms DIA are provided between the lenses LS1 and the light emitting element groups 295. These diaphragms DIA are formed by perforating apertures AP in a diaphragm flat plate 298.

The diaphragm DIA and the lens LS (LS1) are in the following positional relationship in a light beam propagation direction Doa. Specifically, the diaphragm DIA is arranged in a range within 10% of the sag Lsg of the lens LS from a top Lt of the lens LS (top of the convex surface of the lens LS) in the light beam propagation direction Doa. This is more specifically described using the large chain double-dashed line circle of FIG. 13. First of all, when a straight line L(0) is a straight line passing the top Lt of the lens LS and parallel to the longitudinal direction LGD, a distance between this straight line L(0) and an under surface 2991-t of a lens array substrate 2991 in the light beam propagation direction Doa is the sag Lsg of the lens LS. When a straight line at a distance of 0.9×Lsg from the lens array substrate under surface 2991-t in the light beam propagation direction Doa and parallel to the longitudinal direction LGD is a straight line L(−1) and a straight line at a distance of 1.1×Lsg from the lens array substrate under surface 2991-t in the light beam propagation direction Doa and parallel to the longitudinal direction LGD is a straight line L(+1), the diaphragm DIA is arranged between the straight lines L(−1) and L(+1) in the light beam propagation direction Doa. Particularly in the second embodiment, the diaphragm DIA is located more toward an image plane side than the top Lt of the lens LS, that is, the diaphragm DIA is arranged between the straight lines L(0) and L(−1) in the light beam propagation direction Doa. In other words, a position P1 of the top Lt in the propagation direction Doa of a light beam originating from the light emitting element 2951 and a position P2 of the diaphragm DIA in the propagation direction Doa of the light beam originating from the light emitting element 2951 satisfy the following formula:

$P1 \leq P2 \leq P1 + 0.1 \times Lsg.$

Figure 14:
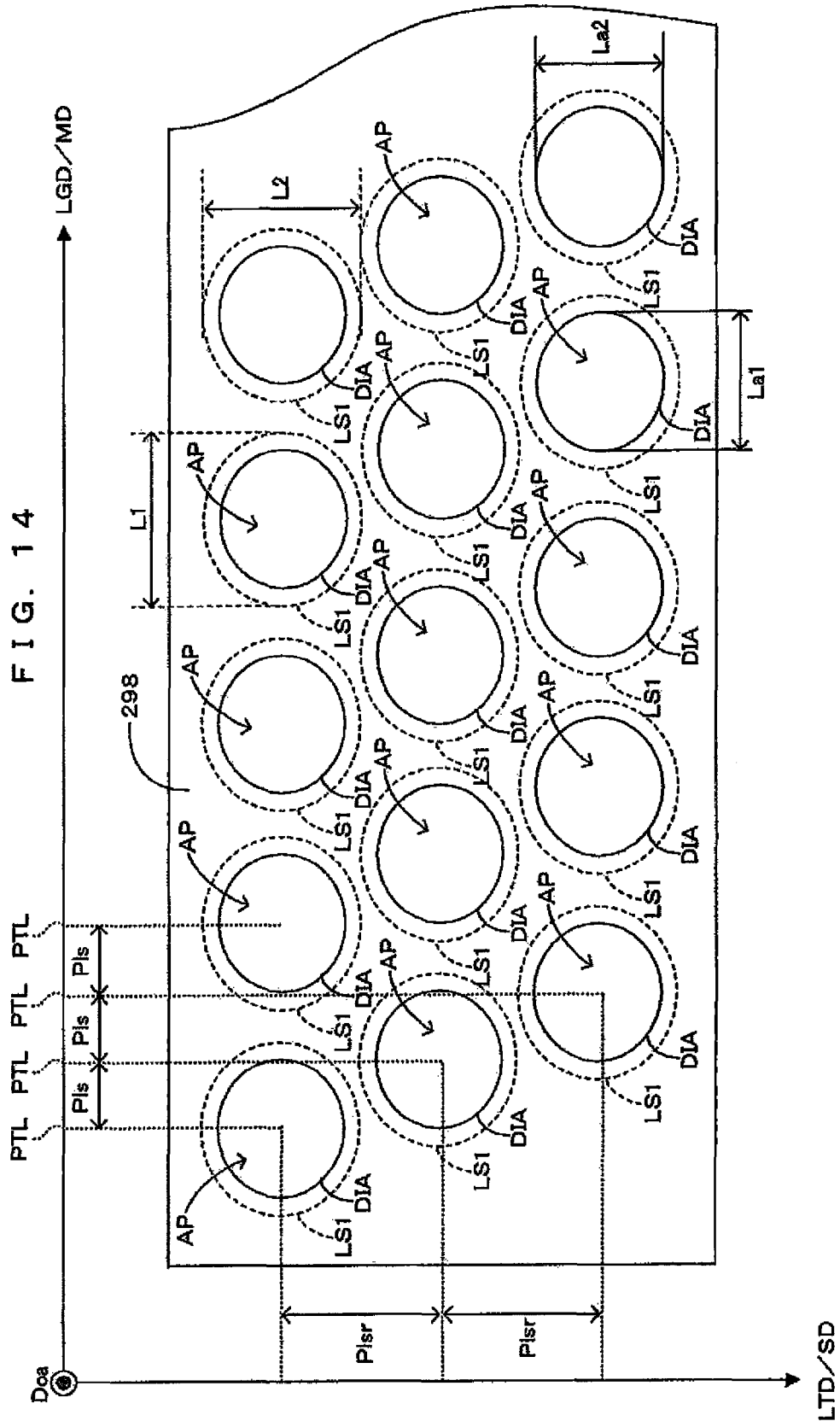
FIG. 14 is a partial plan view showing the structure of the diaphragms according to the second embodiment.

FIG. 14 is a partial plan view showing the structure of the diaphragms according to the second embodiment. In FIG. 14, the lenses LS are shown in broken line. This is to show the relationship of the lenses LS1 and the diaphragms DIA, but does not indicate that the lenses LS1 are provided on the diaphragm flat plate 298. First of all, the structure of the lenses LS1 according to the second embodiment in a plan view is described below. The lenses LS1 have an elliptical shape in the plan view. A length L1 (lens main scanning width L1) of each lens LS1 in the longitudinal direction LGD and a length L2 (lens sub scanning width L2) thereof in the width direction LTD satisfy the following formula:

$1 < L1/L2 < 1.2.$

Further, the lenses LS1 are aligned at lens pitches Pls in the longitudinal direction LGD while being arranged at lens row pitches Plsr in the width direction LTD.

Next, the structure of the diaphragms in a plan view is described. As shown in FIG. 14, the diaphragm flat plate 298 is provided with a plurality of diaphragms DIA in a one-to-one correspondence with a plurality of lenses LS1 and the geometric centers of the lenses LS1 and the diaphragms DIA in the correspondence relationship coincide. In the second embodiment, a length La1 (diaphragm main scanning diameter La1) of each diaphragm DIA in the longitudinal direction LGD and a length. La2 (diaphragm sub scanning diameter La2) thereof in the width direction LTD satisfy the following formula:

$1 < La1/La2.$

Particularly in the second embodiment, the following formula:

$L1/L2 = La1/La2$ is satisfied. Further, the respective diaphragms DIA have an elliptical shape similar (identical) to the corresponding lenses LS1.

As described above, in the second embodiment, the lens main scanning width L1 and the lens sub scanning width L2 satisfy the following formula:

$1 < L1/L2.$

In other words, the length of each lens LS in the width direction LTD is set to be shorter, whereas the length thereof in the longitudinal direction LGD is set to be longer. Accordingly, larger quantities of lights can be incident on the lenses LS in the longitudinal direction LGD while pitches (lens row pitches Plsr) between the lenses LS in the width direction LTD are suppressed. Therefore, a line head 29 can be miniaturized while a good exposure at a high resolution is enabled.

Further, in the second embodiment, the lens main scanning width L1 and the lens sub scanning width L2 satisfy the following relationship:

$L1/L2 < 1.2.$

By employing such a construction, the lenses LS with little astigmatism can be easily formed by suppressing a difference between the lens main scanning width L1 and the lens sub scanning width L2, which makes it possible to easily realize a good exposure. Particularly, in the case of forming lenses using a mold, the construction satisfying the formula of L1/L2<1.2 is preferable. Specifically, in lens formation using a mold, the lenses are released from the mold by letting the lenses LS contract with respect to the mold. At this time, if the difference between the lens main scanning width L1 and the lens sub scanning width L2 is large, a degree of contraction of the lens in the longitudinal direction LGD (main scanning direction MD) and the one in the width direction LTD (sub scanning direction SD) differ, and hence, astigmatism is likely to occur. In contrast, by constructing to satisfy the formula of L1/L2<1.2, astigmatism can be easily suppressed to a trouble-free level and a good exposure can be easily realized.

The second embodiment is preferable since the diaphragm main scanning diameter La1 and the diaphragm sub scanning diameter La2 satisfy the relationship defined by the following formula:

$1 < La1/La2.$

In other words, as described above, the lenses LS1 have a property of receiving larger quantities of lights in the main scanning direction MD (longitudinal direction LGD) in the second embodiment, whereas the diaphragms DIA are for shielding parts of lights propagating from the light emitting elements 2951 toward the lenses LS1. Accordingly, in light of effectively utilizing the lens property of this embodiment, the diaphragms DIA are preferably so shaped as to be advantageous in letting larger quantities of lights incident on the lenses in the main scanning direction MD (longitudinal direction LGD) in order to effectively utilize lights from the light emitting elements 2951 by suppressing unnecessary light shielding by the diaphragms DIA. In this respect, since the formula of 1<La1/La2 is satisfied in the second embodiment, larger quantities of lights can be incident on the lenses LS1 in the main scanning direction MD (longitudinal direction LGD), which enables a good exposure.

Further, the second embodiment is constructed such that the lens main scanning width L1, the lens sub scanning width L2, the diaphragm main scanning diameter La1 and the diaphragm sub scanning diameter La1 satisfy the following formula:

$$L1/L2=La1/La2.$$

Accordingly, lights from the light emitting elements 2951 can be more effectively utilized.

Furthermore, the second embodiment is constructed such that the shape of the lenses LS1 and that of the diaphragms DIA are similar, which makes it possible to more effectively utilize lights from the light emitting elements 2951.

Further, the second embodiment is constructed such that the diaphragms DIA are located in the range within 10% of the sags Lsg of the lenses LS from the tops Lt of the lenses LS1. Accordingly, lights from the light emitting elements 2951 can be very effectively utilized by suppressing unnecessary light shielding by the diaphragms DIA. In addition, the diaphragms DIA are located more toward the image plane side than the tops Lt of the lenses LS. Therefore, the utilization efficiency of lights from the light emitting elements 2951 can be more improved.

C. Miscellaneous

As described above, in the above embodiments, the longitudinal direction LGD and the width direction LTD are orthogonal to or substantially orthogonal to each other, the main scanning direction MD and the sub scanning direction SD are orthogonal to or substantially orthogonal to each other, the longitudinal direction LGD and the main scanning direction MD are parallel to or substantially parallel to each other and the width direction LTD and the sub scanning direction SD are parallel to or substantially parallel to each other. Thus, the longitudinal direction LGD and the main scanning direction MD correspond to a "first direction" of the invention, and the width direction LTD and the sub scanning direction SD correspond to a "second direction" of the invention. The lenses LS are arranged in the first direction and in the second direction. Further, the length L1 corresponds to a "lens first direction length" of the invention, the length L2 to a "lens second direction length" of the invention, the length La1 to a "diaphragm first direction length" of the invention and the length La2 to a "diaphragm second direction length" of the invention. The lens array substrate 2991 corresponds to a "lens substrate" of the invention. Further, the head substrate 293 corresponds to a "light emitting element substrate" of the invention. When the lenses LS1 are "first lenses" of the invention, the lenses LS2 correspond to "second lenses" of the invention. Further, the line head 29 corresponds to an "exposure head" of the invention. Furthermore, the photosensitive drum 21 corresponds to a "latent image carrier" of the invention.

The invention is not limited to the above embodiments and various changes other than the above can be made without departing from the gist thereof. For example, in the above embodiments, four light emitting elements 2951 are aligned in the longitudinal direction LGD in each light emitting element row 2951R, and two light emitting element rows 2951R are arranged in the width direction LTD in each light emitting element group 295. However, the number of the light emitting elements 2951 constituting the light emitting element row 2951R and the number of the light emitting element rows 2951R constituting the light emitting element group 295 are not limited to these. Accordingly, the light emitting element group 295 can be configured as described below.

Figure 15:
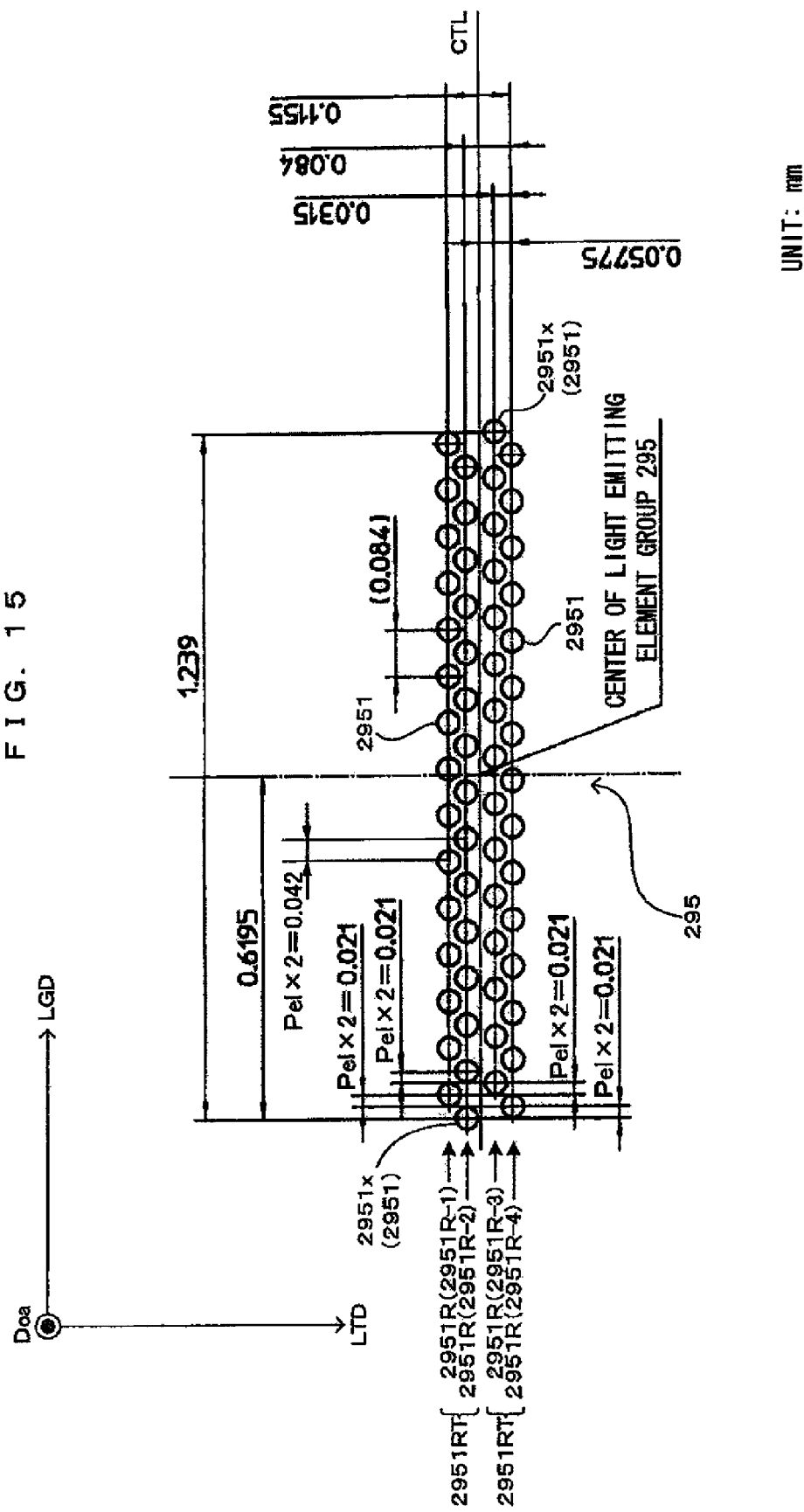
FIG. 15 is a plan view showing other structure of the light emitting element groups.
Figure 16:
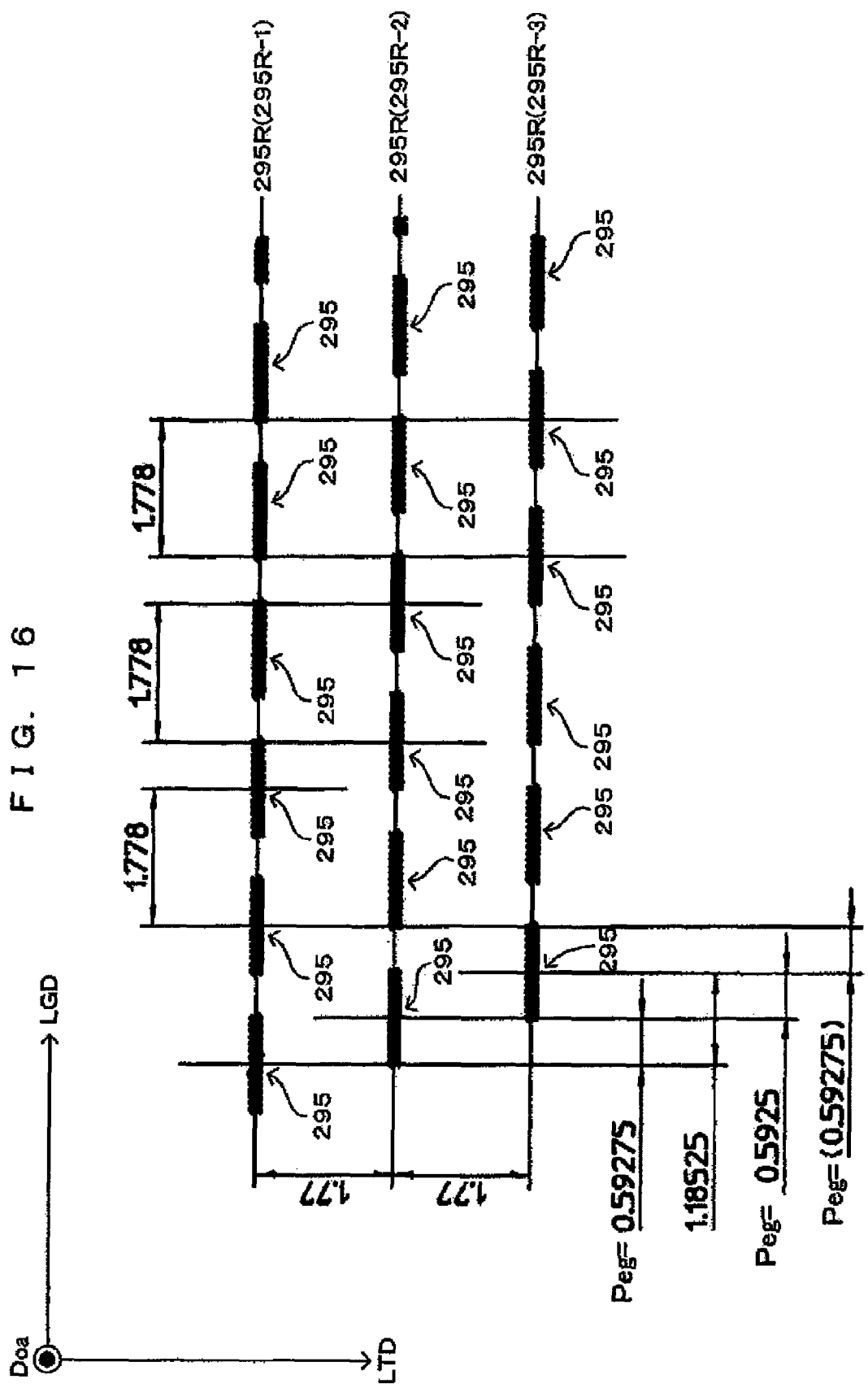
FIG. 16 is a view showing the structure of the under surface of the head substrate on which the plurality of light emitting element groups shown in FIG. 15 are arranged.

FIG. 15 is a plan view showing other structure of the light emitting element groups. FIG. 16 is a view showing the structure of the under surface of the head substrate on which the plurality of light emitting element groups shown in FIG. 15 are arranged and corresponds to a case where the under surface is viewed from the top surface of the head substrate. In the structure shown in FIG. 15, fifteen light emitting elements 2951 are arranged side by side in the longitudinal direction LGD to form the light emitting element rows 2951R. That is, the embodiment shown in FIG. 15 corresponds to the case where m=15. In the light emitting element rows 29518, the light emitting elements 2951 are arranged at pitches (=0.084 [mm]) which are four times as large as the element pitches Pel (=0.021 [mm]). Four such light emitting element rows 2951R (2951R-1, 2951R-2, 2951R-3, 2951R-4) are arranged in the width direction LTD. That is, the embodiment shown in FIG. 15 corresponds to the case where n=4. In the width direction LTD, the pitch between the light emitting element row 2951R-4 and the light emitting element row 2951R-1 is 0.1155 [mm], the pitch between the light emitting element row 2951R-4 and the light emitting element row 2951R-2 is 0.084 [mm], and the pitch between the light emitting element row 2951R-4 and the light emitting element row 2951R-3 is 0.0315 [mm]. Further, when a straight line which is parallel to the longitudinal direction LGD and passes through the center (of gravity) of the light emitting element group 295 is a center line CTL, the pitch in the width direction LTD between the light emitting element row 2951R-1 and the center line CTL and that between the light emitting element row 2951R-4 and the center line CTL are 0.05775 [mm], respectively.

In FIG. 15, the two light emitting element rows 2951R-1 and 2951R-2 above the center line CTL constitute a light emitting element set 2951RT and the two light emitting element rows 2951R-3 and 2951R-4 below the center line CTL constitute a light emitting element set 2951RT. In each light emitting element set 2951RT, two light emitting element rows 2951R are shifted from each other in the longitudinal direction LGD by a pitch (=0.042 [mm]) which is twice as large as the element pitch Pel (=0.021 [mm]). Further, the two light emitting element sets 2951RT are shifted from each other in the longitudinal direction LGD by the element pitch Pel (=0.021 [mm]). Hence, the four light emitting element rows 2951R are shifted from each other in the longitudinal direction LGD by the element pitches Pel (=0.021 [mm]). As a result, the positions of the light emitting elements 2951 in the longitudinal direction LGD are different. When the light emitting elements 2951 at the both ends of the light emitting element groups 295 in the longitudinal direction LGD are called end light emitting elements 2951x, the pitch between the end light emitting elements 2951x in the longitudinal direction LGD is 1.239 [mm] and the pitch between the end light emitting element 2951x and the center of the light emitting element group 295 in the longitudinal direction LGD is 0.6195 [mm].

In the embodiment shown in FIG. 16, the light emitting element groups 295 shown in FIG. 15 are two-dimensionally arranged. As shown in FIG. 16, the plurality of light emitting element groups 295 are arranged in the longitudinal direction LGD to form the light emitting element group rows 295R. In the light emitting element group rows 295R, the light emitting element groups 295 are arranged at pitches (=1.778 [mm]) which are triple as large as the light emitting element group pitches Peg. Three light emitting element group rows 295R (295R-1, 295R-2, 295R-3) structured in this way are arranged in the width direction LTD at the light emitting element group row pitches Pegr (=1.77 [mm]). The light emitting element group rows 295R are shifted from each other in the longitudinal direction LGD by the light emitting element group pitches Peg (which are about 0.593 [mm]). That is, the light emitting element group row 295R-1 and the light emitting element group row 295R-2 are shifted from each other in the longitudinal direction LGD by 0.59275 [mm], the light emitting element group row 295R-2 and the light emitting element group row 295R-3 are shifted from each other in the longitudinal direction LGD by 0.5925 [mm], and the light emitting element group row 295R-3 and the light emitting element group row 295R-1 are shifted from each other in the longitudinal direction LGD by 0.59275 [mm]. Hence, the light emitting element group row 295R-1 and the light emitting element group row 295R-3 are shifted from each other in the longitudinal direction LGD by 1.18525 [mm].

Further, in the above embodiments, the shape of each lens LS is a substantially reversed fan shape, a substantially fan shape or a flat shape. In other words, the lenses LS of the above embodiments are shaped as if by cutting end(s) of substantially circular lenses. For example, the lenses LS-u are shaped by cutting the lower ends of the substantially circular lenses in the longitudinal direction LGD, and the lenses LS-m are shaped by cutting both upper and lower ends of the substantially circular lenses in the longitudinal direction LGD. However, the shapes of the lenses LS are not limited to these. In short, the effects of the invention can be exhibited when the lens longitudinal direction length L1 is longer than the lens width direction length L2. Accordingly, the lenses can be formed, for example, as follows.

Figure 17:
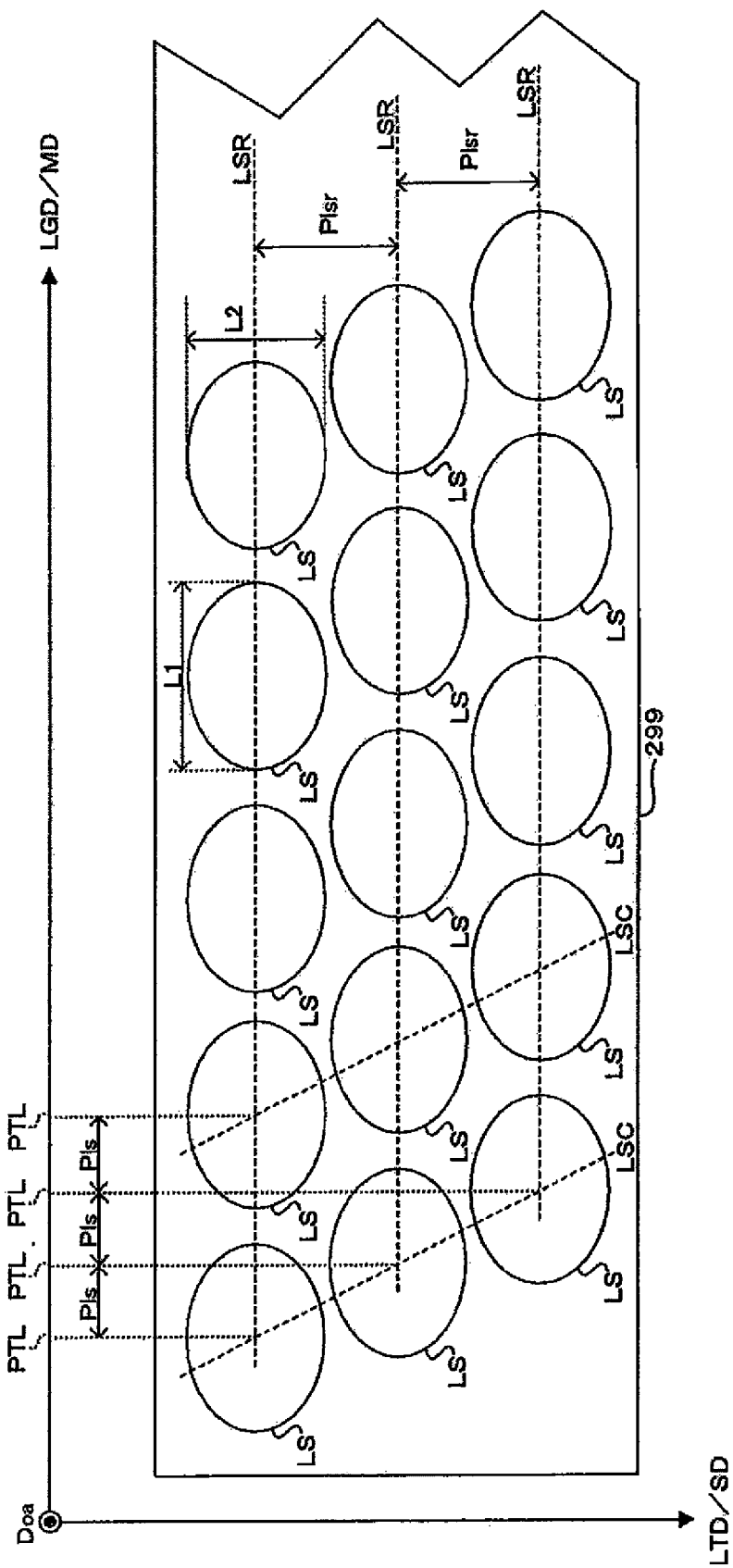
FIG. 17 is a diagram showing the construction of a lens array according to another embodiment of the invention.

FIG. 17 is a diagram showing the construction of a lens array according to another embodiment of the invention, and corresponds to a case where the lens array is seen from an image plane side (in a light beam propagation direction Doa). Lenses LS in FIG. 17 are formed on an under surface 2991-*t* of a lens array substrate 2991, and FIG. 17 shows the construction on this lens array substrate under surface 2991-*t*. Points of difference between the above embodiments and this embodiment are mainly described below and common parts are not described.

As shown in FIG. 17, the respective lenses LS have an elliptical shape long in the longitudinal direction LGD. Accordingly, a lens longitudinal direction length L1 and a lens width direction length L2 satisfy the following formula:

L1>L2.

Thus, in this embodiment as well, larger quantities of lights can be incident on the lenses LS in the longitudinal direction LGD while pitches (corresponding to the lens row pitch Plsr) between the lenses LS in the width direction LTD are suppressed. Therefore, in this embodiment, a line head 29 can be miniaturized while a good exposure at a high resolution is enabled.

In the above embodiments, three lens rows LSR are arranged in the width direction LTD. However, the number of the lens rows LSR is not limited to three and the invention is applicable to constructions with two or more lens rows LSR.

Further, in the embodiments above, the lenses LS are formed on the under surface 2991-*t* of the lens array substrate to constitute the lens array 299. However, the structure of the lens array is not limited to this. That is, the lenses LS may be formed on the top surface 2991-*h* of the lens array substrate 2991 to constitute the lens array 299, or alternatively, the lenses LS may be formed on the both surfaces 2991-*t* and 2991-*h* of the lens array substrate to constitute the lens array 299.

Further, although the two lens arrays 299 are used in the above embodiments, the number of the lens arrays 299 is not limited to this.

In the above embodiments, organic EL devices are used as the light emitting elements 2951. However, the devices other than the organic EL devices may be used as the light emitting elements 2951. For example, LEDs (light emitting diodes) may be used as the light emitting elements 2951.

D. Examples

Next, examples of the invention are described, but the invention is not restricted by the following examples and can be, of course, embodied by being appropriately changed within the scope conformable to the gist described above and below. Any of these examples are embraced by the technical scope of the invention.

Examples to be described below have constructions advantageous to realize a good exposure while miniaturizing the image forming apparatus. Specifically, the diameter of the photosensitive drum 21 is an essential point upon determining the size of the image forming apparatus. Accordingly, for the miniaturization of the image forming apparatus, it is desired to make the diameter of the photosensitive drum 21 smaller. However, in addition to the line head 29, functioning units such as the charger 23 and the developer 25 need to be arranged in the sub scanning direction SD around the photosensitive drum 21. Thus, there were cases where these functioning units could not be arranged if the diameter of the photosensitive drum 21 was simply made smaller. In contrast, the line head 29 of the invention is miniaturized in the width direction LTD (sub scanning direction SD). Therefore, the diameter of the photosensitive drum 21 can be made smaller while a space for arranging the respective functioning units is ensured.

However, another problem as described next occurred in some cases if the diameter of the photosensitive drum 21 is made smaller in this way. Specifically, if the diameter of the photosensitive drum 21 is made smaller, the curvature of the surface shape of the photosensitive drum 21 increases. Accordingly, in the case where a plurality of lenses LS are arranged in the width direction LTD as in the line head 29 described above, imaged positions by some lenses LS may be displaced from the surface of the photosensitive drum 21 if the imaging positions in the light propagation direction Doa are similarly set for the respective lenses LS. As a result, no good exposure could be performed in some cases. Accordingly, technology enabling the realization of a good exposure while making the diameter of the photosensitive drum 21 smaller is described in the following examples.

Figure 18:
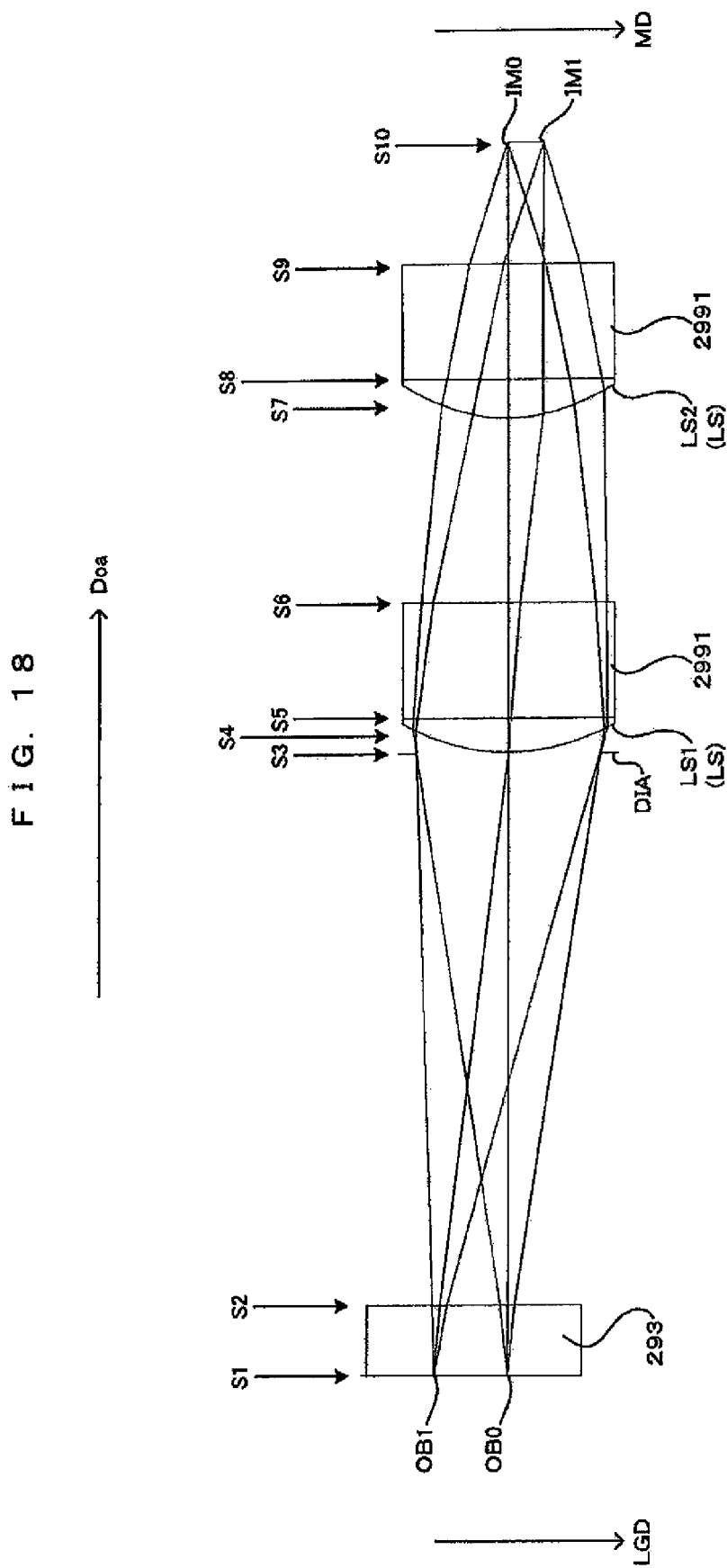
FIG. 18 is a view showing an optical system according to the example and showing a cross section taken along the main scanning direction.

FIG. 18 is a view showing an optical system according to the example and showing a cross section taken along the main scanning direction MD. In this example, a diaphragm DIA is provided in front of the first lens LS1 in the light beam propagation direction Doa so that a light beam restricted by the diaphragm DIA impinges upon the first lens LS1. FIG. 18 shows the optical path of a light beam which leaves an object point OB0, which is on the optical axis OA, and converges at an image point IM0 and the optical path of a light beam which leaves an object point OB1, which is different from the optical axis OA, and converges at an image point IM1. The structure other than the diaphragm DIA is approximately similar to those according to the first embodiment and the like. The optical systems including the lenses LS are arranged such that the three lenses LS-u, LS-m and LS-d are arranged in the direction of the line A-A shown in FIG. 5 and the like to form the lens rows.

Figure 19:
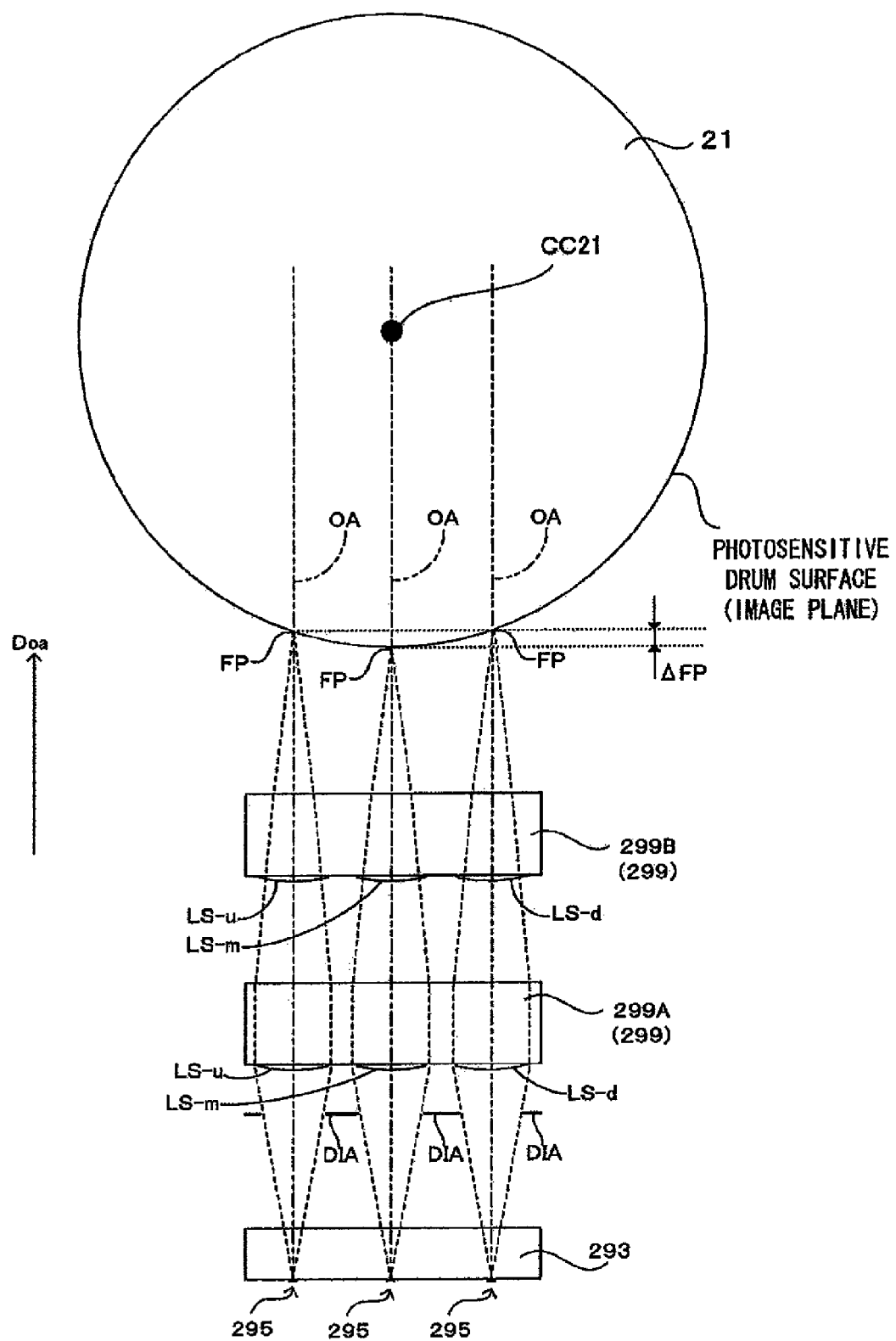
FIG. 19 is a partial cross sectional view of the line head and the photosensitive drum taken along the line A-A according to the example.

FIG. 19 is a partial cross sectional view of the line head and the photosensitive drum taken along the line A-A according to the example. As shown in FIG. 19, the line head formed by the light emitting element groups 295, the diaphragm DIA and the lens arrays 299A and 299B is arranged opposed against the photosensitive drum 21. The photosensitive drum 21 has an approximately cylindrical shape around a rotation axis CC21, and the surface of the photosensitive drum has a finite curvature. The shape of the surface of the photosensitive drum will now be specifically referred to as a "curvature shape".

In this example, the respective optical systems are arranged at equal pitches in a horizontal direction in FIG. 19, and the optical axis OA of the optical system including the middle lenses LS-m passes through the rotation axis CC21 of the photosensitive drum 21. Hence, in order to approximately coincide the image forming positions at which the optical systems focus light beams with the surface of the photosensitive drum, it is necessary to adjust, for each optical system, the image forming position in the light beam propagation direction Doa (that is, the direction of the optical axes OA). In the example shown in FIG. 19, between the optical systems which include the upstream lenses LS-u and the optical systems which include the downstream lenses LS-d, the image forming positions FP in the light beam propagation direction Doa are equal to each other. On the other hand, between the optical systems which include the upstream lenses LS-u (or the downstream lenses LS-d) and the optical systems which include the middle lenses LS-m, the image forming positions in the light beam propagation direction Doa are different from each other by a distance ΔFP. As the data below show, in this example, the optical systems which include the lenses LS-u and LS-d have different structures from the optical systems which include the middle lenses LS-m.

FIG. 20 is a table showing optical data according to this example. As shown in FIG. 20, the wavelength of light beams emitted from the light emitting elements is 690 [nm]. The diameter of the photosensitive member is 40 [mm]. FIG. 21 is a table showing the data of the optical systems which include the middle lenses. As shown in FIG. 21, in the optical systems which include the middle lenses LS-m, the lens surfaces (denoted at the surface number S4) of the first lenses LS1 and the lens surfaces (denoted at the surface number S7) of the second lenses LS2 are both free-form surfaces (X-Y polynomial surfaces). FIG. 22 is a drawing of definitional equations which define the X-Y polynomial surfaces. The shape of the lens surfaces of the first lenses LS1 is expressed by these equations and the coefficients which are shown in FIG. 23. The shape of the lens surfaces of the second lenses LS2 is expressed by these equations and the coefficients which are shown in FIG. 24. FIG. 23 is a table of the coefficients indicative of the surfaces S4 of the optical systems which include the middle lenses, and FIG. 24 is a table of the coefficients indicative of the surfaces S7 of the optical systems which include the middle lenses.

FIG. 25 is a table showing data of an optical system including upstream lenses and downstream lenses. As shown in FIG. 25, also in the optical system including the upstream lenses LS-u and downstream lenses LS-d, both lens surfaces (surface number S4) of the first lenses LS1 and those (surface number S7) of the second lenses LS2 are free-form surfaces (XY polynomial surfaces). The lens surface shape of the first lenses LS1 is given by the definition formula of FIG. 22 and a coefficient shown in FIG. 26 and that of the second lenses LS2 is given by the same definition formula and a coefficient shown in FIG. 27. Here, FIG. 26 is a table showing coefficient values of the surfaces S4 of the optical system including the upstream and downstream lenses, and FIG. 27 is a table showing coefficient values of the surfaces S7 of the optical system including the upstream and downstream lenses.

By applying the invention also to such an optical system so that the lens longitudinal direction length L1 and the lens width direction length L2 satisfy the following formula:

L1>L2, larger quantities of lights can be incident on the lenses LS in the longitudinal direction LGD while pitches (corresponding to the lens row pitch Plsr) between the lenses LS in the width direction LTD are suppressed.

Further, the imaging positions of the respective lenses LS are adjusted in conformity with the surface shape of the photosensitive drum 21. Accordingly, a good exposure can be realized while the miniaturization of the image forming apparatus is promoted by making the diameter of the photosensitive drum 21 smaller.

In the above example, the lenses LS of the lens array 299 are free-form surface lenses. Accordingly, the imaging characteristic of the lenses is improved and a better exposure can be realized. Here, the free-form surface lenses are lenses whose lens surfaces are free-form surfaces.

The diameter of the photosensitive drum 21 is not limited to the above value and can be changed. Accordingly, the diameter of the photosensitive drum 21 may be changed, for example, as shown in FIG. 28 to be described next. FIG. 28 is a table showing another numerical example and corresponds to a case where the diameter of the photosensitive drum 21 is 30 [mm]. As shown in FIG. 28, the lens longitudinal direction length L1 (lens main scanning width L1) is 1.7 [mm], whereas the lens width direction length L2 (lens sub scanning width L2) is suppressed to 1.5 [mm]. As a result, the lens row pitch Plsr is suppressed to 1.54 [mm]. Further, the lens pitch Pls is 1.778 [mm].

In order to adjust imaging positions FP for each lens row LSR in conformity with the shape of the photosensitive drum 21 having a diameter of 30 [mm], the imaging positions are changed in the optical system including the upstream lenses LS-u (or downstream lenses LS-d) and the optical system including the middle lenses LS-m. Specifically, a distance ΔFP=0.78 [mm]. The distance ΔFP in this numerical example is obtained based on the data of the optical systems shown in FIGS. 19 to 27.

FIG. 29 is a table showing still another numerical example and corresponds to a case where the diameter of the photosensitive drum 21 is 45 [mm]. In this numerical example, the lens row pitch Plsr is suppressed to 1.5 [mm]. Further, in order to adjust the imaging positions FP for each lens row LSR in conformity with the shape of the photosensitive drum 21 having a diameter of 45 [mm], the imaging positions are changed in the optical system including the upstream lenses LS-u (or downstream lenses LS-d) and the optical system including the middle lenses LS-m. Specifically, a distance ΔFP=0.05 [mm].

As described above, in this still another numerical example shown in FIG. 29, the distance ΔFP is suppressed to a smaller value as compared with the above another numeral example shown in FIG. 28. As a result, a lens design can be simplified without needing to drastically change the lens characteristic for each lens LS. This is caused by setting the lens row pitch Plsr (=1.5 [mm]) shorter with respect to the diameter (=45 [mm]) of the photosensitive drum 21. Upon simplifying the lens design in this way, the lens row pitch Plsr may be set to or below 1/20 of the diameter (=45 [mm]) of the photosensitive drum 21.

Further, in an embodiment of an aspect of the invention, a length L1 of the lens in the first direction and a length L2 thereof in the second direction may satisfy a relationship defined by a following formula: L1/L2<1.2. By employing such a construction, lenses with little astigmatism can be easily formed by suppressing the difference between the length L1 of the lens in the first direction and the length L2 thereof in the second direction. Hence, a good exposure can be easily realized.

Further, a lens array may include a lens substrate on which the lenses are formed. By constructing the lens array with the lens substrate and the lenses in this way, a degree of freedom in the construction of the lens array is improved, for example, by enabling the selection of different base materials for the lens substrate and the lenses. Thus, the lens array can be appropriately designed depending on specification required for the exposure head, which enables to more easily realize a good exposure by the exposure head.

An aspect of the invention is also applicable to a construction including a diaphragm arranged between the light emitting element and the lens. As described above, according to an aspect of the invention, the lenses have a property of receiving large quantities of light in the first direction, whereas the diaphragm is designed to shield part of light propagating from the light emitting element toward the lens. Accordingly, in light of effectively utilizing the lens property of the invention, the diaphragm is preferably so shaped as to be advantageous in letting large quantities of light incident on the lens in the first direction in order to effectively utilize light from the light emitting element by suppressing unnecessary light shielding by the diaphragm. Thus, the length La1 of the diaphragm in the first direction (diaphragm first direction length La1) and the length La2 thereof in the second direction (diaphragm second direction length La2) may satisfy a relationship defined by the following formula: $1<La1/La2$. In this way, larger quantities of light can be incident on the lens in the first direction and a good exposure is possible.

At this time, the lens first direction length L1, the lens second direction length L2, the diaphragm first direction length La1 and the diaphragm second direction length La2 may satisfy the following formula: $L1/L2=La1/La2$. In this way, light from the light emitting element can be more effectively utilized.

Further, the shape of the lens and that of the diaphragm may be identical. In this way, light from the light emitting element can be even more effectively utilized.

The diaphragm may have elliptical shape.

Further, the surface of the lens facing the light emitting element may be a convex surface. At this time, the utilization efficiency of light from the light emitting element can be further improved by arranging the diaphragm more toward the image plane side than the top of the convex surface of the lens.

Further, the lenses may be free-form surface lenses. This is because the imaging characteristic of the lenses is improved and a better exposure can be realized by employing the free-form surface lenses.

An embodiment of a line head according to another aspect of the invention comprises a head substrate and a lens array. Light emitting element groups each formed by grouping light emitting elements are arranged on the head substrate. The lens array includes a lens array substrate having lenses arranged thereon in a one-to-one correspondence with the light emitting element groups. Lights from the light emitting element groups are incident on the lenses corresponding to the light emitting element groups. Lens rows each made up of lenses aligned in a first direction are arranged in a second direction orthogonal to or substantially orthogonal to the first direction on the lens array substrate. The following formula: $L1>L2$ is satisfied, where the symbol L1 denotes a length of the lens in the first direction and the symbol L2 denotes a length thereof in the second direction.

An embodiment of an image forming apparatus according to still another aspect of the invention comprises a line head and a latent image carrier that is exposed by the line head. The line head includes a head substrate and a lens array. Light emitting element groups each formed by grouping light emitting elements are arranged on the head substrate. The lens array includes a lens array substrate having lenses arranged thereon in a one-to-one correspondence with the light emitting element groups. Lights from the light emitting element groups are incident on the lenses corresponding to the light emitting element groups. Lens rows each made up of lenses aligned in a first direction are arranged in a second direction orthogonal to or substantially orthogonal to the first direction on the lens array substrate. The following formula: $L1>L2$ is satisfied, where the symbol L1 denotes a length of the lens in the first direction and the symbol L2 denotes a length thereof in the second direction.

In each of the embodiments (line head, image forming apparatus) thus constructed, the lens array substrate having the lenses arranged thereon in one-to-one correspondence with the light emitting element groups is provided and the lens rows each made up of the lenses aligned in the first direction are arranged in the second direction orthogonal to or substantially orthogonal to the first direction on this lens array substrate. When L1 denotes the length of the lens in the first direction and L2 denotes the length thereof in the second direction, the line head is so constructed as to satisfy the following formula: $L1>L2$. In other words, the length of the lens in the second direction is set to be shorter, whereas the length thereof in the first direction is set to be longer. Accordingly, larger quantities of lights can be incident on the lenses in the first direction while pitches between the lenses in the second direction are suppressed. Therefore, in each of the embodiments, the line head can be miniaturized while a good exposure at a high resolution is enabled.

Further, in each of the embodiments, the lens array includes the lens array substrate and the lenses are arranged on the lens array substrate. Accordingly, a degree of freedom in the construction of the lens array is improved, for example, by enabling the selection of different base materials for the lens array substrate and the lenses. Thus, the lens array can be appropriately designed depending on specification required for the line head and a good exposure by the line head can be easily realized.

The lens array substrate may be made of a glass. In other words, the glass has a relatively small linear expansion coefficient. Accordingly, the deformation of the lens array caused by a temperature change can be suppressed by making the lens array substrate of the glass, and hence, a good exposure can be realized independently of temperature.

The lenses may be made of a light curing resin. In other words, the light curing resin is cured upon light irradiation. Accordingly, the lens array can be easily produced by making the lenses of this light curing resin, and hence, the cost of the line head can be suppressed.

The embodiment is particularly preferably applied to a line head including organic EL devices as the light emitting elements. In other words, in the case where the organic EL devices are used as the light emitting elements, light quantities of the light emitting elements are smaller as compared with the case using LEDs or the like. This is particularly notable in the case of using bottom emission-type organic EL devices as the light emitting elements. Accordingly, in order to realize a good exposure, it is preferable to let larger quantities of lights incident on the lenses by applying the embodiment.

The embodiment is particularly preferably applicable to an image forming apparatus in which a surface of the latent image carrier is moved in the second direction and light emitting elements of a line head are driven for light emission at timings in conformity with a movement of the latent image carrier surface to expose the latent image carrier surface. In other words, as described earlier, there were cases where an increase in pitches between the lenses in the second direction caused an exposure failure in such an image forming apparatus. In contrast, in the case of applying the embodiment, the pitches between the lenses in the second direction are suppressed and a good exposure is possible.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:
    an exposure head that includes
        a light emitting element substrate that is provided with light emitting elements that emit lights and are arranged in a first direction and a second direction orthogonal or substantially orthogonal to the first direction,
        a lens array that has lenses that are arranged in the first direction and the second direction and image a light emitted from the light emitting elements, and
        a diaphragm that is arranged between the light emitting elements and the lenses; and
    a latent image carrier that is exposed by the exposure head to form a latent image and moves in the second direction,
    wherein a relationship defined by a following formula:

$$1 < L1/L2$$

is satisfied, where the symbol L1 denotes a length of the lens in the first direction and the symbol L2 denotes a length of the lens in the second direction.

2. The image forming apparatus according to claim 1, wherein a relationship defined by a following formula:

$$L1/L2 < 1.2$$

is satisfied.

3. The image forming apparatus according to claim 1, wherein the lens array includes a lens substrate on which the lenses are formed.

4. The image forming apparatus according to claim 1, wherein a relationship defined by a following formula:

$$1 < La1/La2$$

is satisfied, where the symbol La1 denotes a length of the diaphragm in the first direction and the symbol La2 denotes a length of the diaphragm in the second direction.

* * * * *